(12) United States Patent
Kibler

(10) Patent No.: US 9,022,405 B2
(45) Date of Patent: May 5, 2015

(54) RETRACTABLE STAIR ASSEMBLY FOR A TRUCK OR TRAILER

(71) Applicant: Mac Trailer Manufacturing, Inc., Alliance, OH (US)

(72) Inventor: Scott A. Kibler, Kensington, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 0 days.

(21) Appl. No.: 14/183,634

(22) Filed: Feb. 19, 2014

(65) Prior Publication Data

US 2014/0167379 A1    Jun. 19, 2014

Related U.S. Application Data

(63) Continuation-in-part of application No. 13/361,225, filed on Jan. 30, 2012, now Pat. No. 8,678,411.

(51) Int. Cl.
*B60R 3/02* (2006.01)
*E06C 5/06* (2006.01)

(52) U.S. Cl.
CPC .... *B60R 3/02* (2013.01); *E06C 5/06* (2013.01)

(58) Field of Classification Search
USPC ............. 280/163, 166, 169; 182/88, 127
See application file for complete search history.

(56) References Cited

U.S. PATENT DOCUMENTS

| | | | |
|---|---|---|---|
| 2,642,217 A | 6/1953 | Jennings | |
| 3,756,622 A | 9/1973 | Pyle et al. | |
| 4,139,078 A | 2/1979 | Keller | |
| 5,205,603 A * | 4/1993 | Burdette, Jr. | 296/62 |
| 5,228,707 A | 7/1993 | Yoder | |
| 5,425,608 A | 6/1995 | Reitnouer | |
| 5,868,412 A | 2/1999 | Hinkle | |
| 7,168,722 B1 | 1/2007 | Piotrowski et al. | |
| 7,445,268 B2 * | 11/2008 | Faulkiner | 296/183.1 |
| 7,469,915 B2 * | 12/2008 | Horn et al. | 280/163 |
| 8,182,013 B1 * | 5/2012 | Alvarado | 296/62 |

* cited by examiner

*Primary Examiner* — John Walters
(74) *Attorney, Agent, or Firm* — Sand & Sebolt

(57) ABSTRACT

A retractable step assembly for a vehicle includes a track assembly mounted on a vehicle frame beneath a workbed, a step assembly, and a pivot assembly that engages the track and step assemblies together. The step assembly moves between a storage position where it is disposed between tracks of the track assembly, and an operational position where it extends outwardly from the tracks, through an aperture in the vehicle's wall panel, and angles downwardly toward the ground. A foldable handrail on the step assembly is selectively movable between a collapsed position and an extended position. The handrail is in the extended position when the step assembly is operational and folds to the collapsed position when the step assembly is stored. First and second supports are provided for the step assembly to rest upon when in either of the storage position and the operational position.

25 Claims, 20 Drawing Sheets

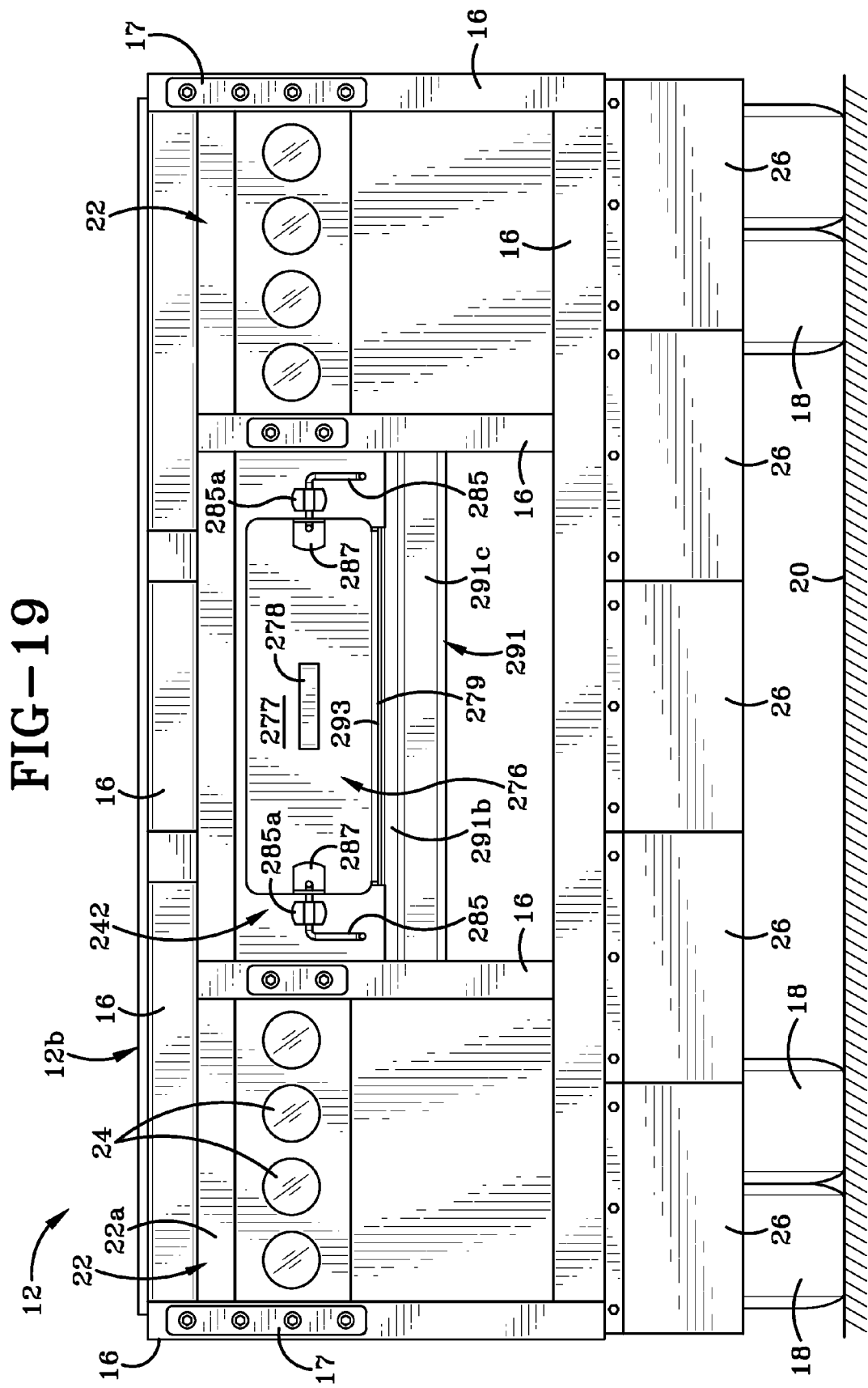

RETRACTABLE STAIR ASSEMBLY FOR A TRUCK OR TRAILER

CROSS-REFERENCE TO RELATED APPLICATION

This is a Continuation-in-Part of U.S. patent application Ser. No. 13/361,225, filed Jan. 30, 2012, the entire specification of which is incorporated herein by reference.

BACKGROUND OF THE INVENTION

1. Technical Field

This invention relates generally to trucks and trailers. More particularly, this invention relates to stairs for use on a truck or trailer body. Specifically, this invention is directed to a stair assembly which includes a step assembly that is retractable into a cavity in the body of the vehicle for storage and is extendable therefrom when needed; and the stair assembly includes strategically placed supports for supporting the step assembly when in either of the storage or operational positions.

2. Background Information

Trucks and trailers are typically built so that their working surfaces are positioned some distance vertically from the ground. Consequently, when it is necessary for the truck driver or some other worker to climb onto the working surface, such as the bed of a flatbed trailer, the vertical distance from the ground to the bed makes getting on and off the bed potentially hazardous.

In order to address this situation, a variety of retractable stair systems have been proposed in the prior art. For example, U.S. Pat. No. 2,642,217 to Jennings discloses a retractable ladder for vehicles. A pair of rails is mounted on the underside of a truck body and each rail includes a longitudinal slot. The ladder includes a first end and a second end. Pins are provided at the first end and these pins are engaged in the slots and act as pivots to move the ladder from a horizontal storage orientation to an angled use orientation, and the pins enable the ladder to slide inwardly between the rails when in a horizontal position. A leaf spring keeps the ladder in its storage position and a catch is also provided to lock the ladder in the storage location beneath the truck body. A handle is provided to enable the driver to lift the ladder over the catch and move it into the operational position.

U.S. Pat. No. 3,756,622 to Pyle et al discloses a step assembly comprised of a frame that is secured to the underside of the truck or trailer and a slider that is able to move into and out of the frame. The frame is comprised of at least two U-shaped channels that are configured and oriented to receive the slider therein. The slider is comprised of two L-shaped channels that have a number of step members pivotally engaged therebetween. The slider is manually lifted upwardly so that it is horizontally aligned with the U-shaped channels and is then slid into the frame. When the slider is in this horizontal orientation, each step is aligned with the plane of the slider. When the driver needs to use the stairs, he slides the slider out of the frame so that it is initially horizontally disposed. The front edge of the frame includes a downwardly extending region that permits the driver to then rotate the slider into a position where it engages the ground. Stops on the frame prevent the slider from being accidentally withdrawn therefrom. As the slider rotates into engagement with the ground, the steps pivot relative to the slider from a first position where they are aligned with the plane of the slider, to a second position where they are angled relative to the plane of the slider and are in a horizontal orientation for use by the driver.

U.S. Pat. No. 4,139,078 to Keller is fairly similar to the device disclosed by Jennings in U.S. Pat. No. 2,642,217 except it includes first and second retaining members. The first retaining member is a cord and hook which keep the ladder secured within a storage compartment beneath the truck bed when the ladder is not in use. The device further includes a second retaining member in the form of wedge-shaped abutments which prevent the ladder from being entirely withdrawn from the storage compartment when it is moved from a storage position to an operational position.

U.S. Pat. No. 5,205,603 to Burdette, Jr. discloses a telescoping ladder assembly that slides into and out of a cavity in the tailgate of a truck bed. Parallel grooves are provided in the tailgate and a pair of runner plates is received in these grooves. The runner plates are generally planar members and each defines a slot therein. Axles secured to one end of a first ladder section are engaged in these two opposed slots and this arrangement pivotally engages the first ladder section to the runner plates and also permits the first ladder section to slide along the grooves when in a horizontal orientation. The first ladder section is made up of two U-shaped legs and a plurality of steps that extend between the steps. A second ladder section is engaged with the first ladder section so that it is able to telescope inwardly and outwardly relative to the first ladder section. A locking mechanism secures the first and second sections together. When the device is to be used, it is first moved to a collapsed position by sliding the second ladder section along the legs of the first ladder section so that the second ladder section is disposed adjacent the first ladder section. The collapsed ladder is then pivoted about the axles at the one end of the first ladder section so that it is generally horizontal and aligned with the plane of the two runner plates. The collapsed ladder is pushed toward the end of the tailgate and this movement causes the collapsed ladder to slide into the cavity in the tailgate. The ladder is subsequently removed therefrom by reversing these steps.

U.S. Pat. No. 5,228,707 to Yoder discloses an automatic stepladder assembly that moves between a storage area beneath the vehicle and an operational position in front of the vehicle. The storage area is located beneath the floor of the vehicle and is accessed through an opening in the side wall of the vehicle. The stepladder assembly is comprised of a staircase, a slider and a driver. The staircase includes two parallel, spaced apart casings and a plurality of steps that are fixedly mounted between the casings. The orientation of the steps relative to the casings does not change as the stepladder assembly is moved back and forth between a storage position and an operational position. The staircase is pivotally connected to the slider at its upper end by pins. The slider includes two parallel side walls and two cross walls that are secured to each other in a generally rectangular configuration. A pair of parallel, horizontally-oriented slide rails is connected to the vehicle frame and extends for a distance under the vehicle. The slide rails are generally C-shaped or U-shaped in cross-section and open toward each other. The staircase and slider ride within these rails between a storage position and an operational position. A roller disposed between the rails and at the edge of the vehicle frame and a motor aid in moving the staircase between the storage and operational positions. When the stepladder moves to the operational position, the slider extends for a distance outwardly beyond the side of the vehicle and a top wall of the slider becomes the first step in the stepladder.

While these devices serve the purposes for which they were intended, there is still a need in the art for a stair assembly that is quickly and readily moved from a storage position to an operational position, and which provides a safe and secure way to climb onto and off of a truck bed

BRIEF SUMMARY OF THE INVENTION

A retractable stair assembly for a vehicle includes a track assembly mounted on a vehicle frame beneath a workbed, a step assembly, and a pivot assembly that engages the track and step assemblies together. The step assembly moves between a storage position where it is disposed between tracks of the track assembly, and an operational position where it extends outwardly from the tracks and through an aperture in the vehicle's wall panel. The step assembly angles downwardly toward the ground. A foldable handrail on the step assembly is selectively movable between a collapsed position and an extended position. The handrail is in the extended position when the step assembly is operational and folds to the collapsed position when the step assembly is stored. First and second supports are provided for the step assembly to rest upon when in either of the storage and operational positions. These supports help prevent rattling and potential damage to the step assembly when in the storage position; and provide added strength to the step assembly when in the operational position.

In one aspect, the invention may provide a retractable stair assembly for a vehicle comprising:

a track assembly adapted to be engaged to a portion of the vehicle's frame;

a step assembly having a first end and a second end;

a pivot assembly securing the first end of the step assembly to a first end of the track assembly; wherein the step assembly is movable between a storage position and an operational position; and when the step assembly is in the storage position the step assembly is disposed within a space defined in the track assembly; and when the step assembly is in the operational position, the step assembly extends outwardly and downwardly from the first end of the track assembly and is adapted to extend downwardly from the vehicle and toward a ground surface upon which the vehicle rests; and a first support positioned a spaced distance beneath the track assembly; and wherein the first support includes a first surface upon which the step assembly rests when the step assembly is in the storage position.

In another aspect, the invention may provide a second support positioned a spaced distance beneath the pivot assembly when the pivot assembly is disposed adjacent the first end of track assembly; wherein the second support includes a first surface upon which the step assembly rests when the step assembly is in the operational position. Still further, the second support may include a second surface upon which the step assembly rests when the step assembly is in the storage position.

In yet another aspect, the invention may provide in combination:

a vehicle having a frame, a workbed mounted on the frame and a wall panel mounted on the frame substantially at right angles to the workbed;

an aperture defined in the wall panel; said aperture providing entry to a region beneath an upper surface of the workbed;

a retractable stair assembly engaged with the frame; wherein the retractable stair assembly comprises:

a track assembly engaged with the vehicle's frame; said track assembly mounted in a region beneath an upper surface of the vehicle's workbed;

a step assembly having a first end and a second end;

a pivot assembly securing the first end of the step assembly to the track assembly; wherein the step assembly is movable between a storage position and an operational position; and when the step assembly is in the storage position the step assembly is disposed in a space defined in the track assembly; and when the step assembly is in the operational position, the step assembly extends outwardly and downwardly from the aperture and toward a ground surface upon which the vehicle rests;

a first support positioned a spaced distance beneath the track assembly; the first support including a first surface upon which the step assembly rests when in the storage position; and a second support mounted on the vehicle a distance beneath the aperture; said second support including a first surface upon which the step assembly rests when in the storage position; and a second surface upon which the step assembly rests when in the operational position.

BRIEF DESCRIPTION OF THE SEVERAL VIEWS OF THE DRAWINGS

A stair assembly in accordance with an aspect of the invention is set forth in the following description and is shown in the drawings and is particularly and distinctly pointed out and set forth in the appended claims.

FIG. 19 is a rear view of the back region of the trailer when the stair assembly is in the storage position.

Similar numbers refer to similar parts throughout the drawings.

DETAILED DESCRIPTION OF THE INVENTION

Figure 1:
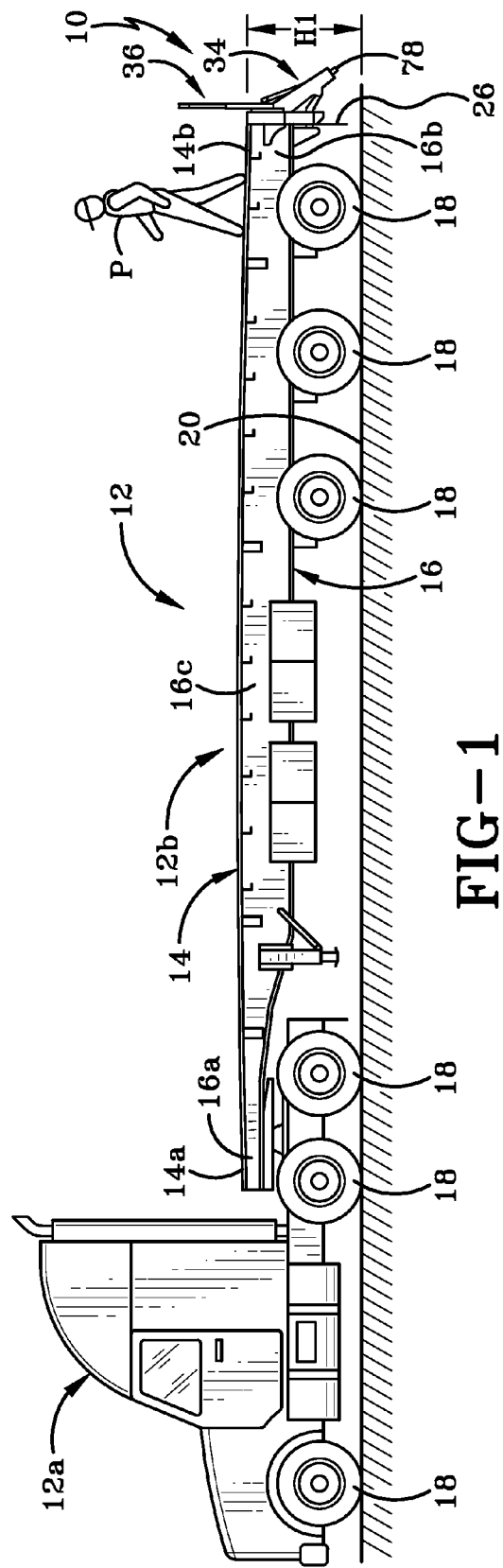
FIG. 1 is a side elevational view of a tractor trailer incorporating the stair assembly of the invention, with the stair assembly shown in the operational position.

Referring to FIGS. 1-12, there is shown a stair assembly in accordance with the invention and generally indicated at 10. Stair assembly 10 is configured to be mounted on a vehicle 12, such as a tractor trailer although any other type of vehicle, such as a panel van could incorporate stair assembly 10. Alternatively, any stationary structure, such as a building having a loading dock, which only periodically requires stairs to move between a lower elevation and a higher elevation, could incorporate the stair assembly 10 of the invention. As illustrated in the attached figures, vehicle 12 comprises a tractor 12a and a trailer 12b. Trailer 12b includes a bed 14 for carrying a load. Bed 14 has a front end 14a and a rear end 14b. Bed 14 is mounted on a frame 16 that is made up of a plurality of different frame members, only some of which are illustrated and numbered in the attached figures. Vehicle 12 further includes bumpers 17, wheels 18 which are engaged with frame 16 and retain the bed 14 a distance "H1" away from a road surface 20. A rear panel 22 made up from one or more sections of planar sheets of metal that are secured to frame 16. Tail lights 24 and mud flaps 26 are also secured to one or both of rear panel 22 and frame 16. An aperture 28 is defined in rear panel 22 and stair assembly 10 is mounted on frame 16. Portions of stair assembly 10 are movable through aperture 28 as will be hereinafter described.

Figure 11:
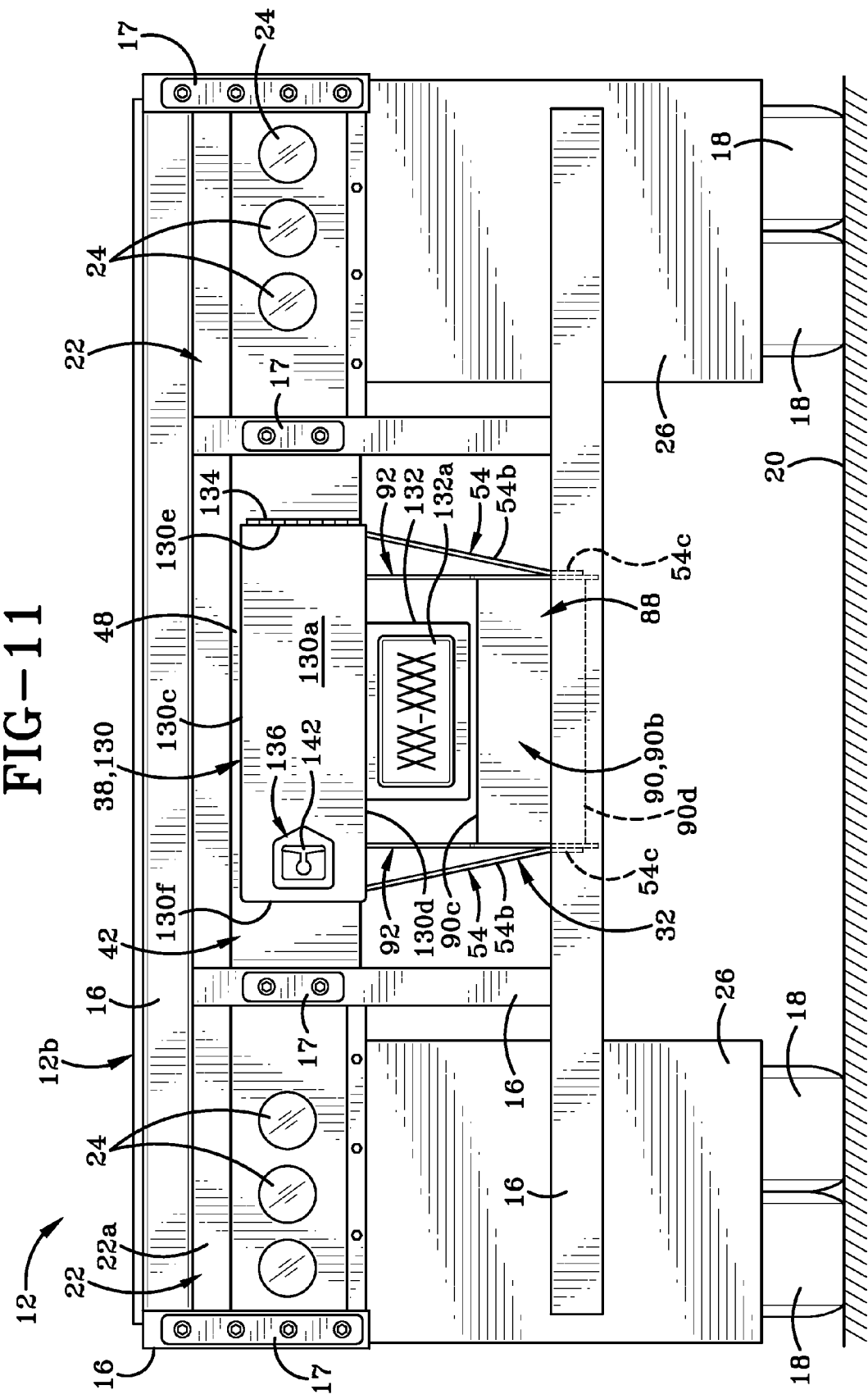
FIG. 11 is a rear view of the back region of the trailer when the stair assembly is in the storage position.

It should be understood that instead of the stair assembly 10 being engaged on frame 16 proximate the rear end 14b/16b of bed 14 and frame 16, stair assembly 10 may be engaged therewith proximate a wall panel at the front end 14a/16a of bed 14 and frame 16, or a wall panel along one or the other sides 16c thereof. Stair assembly 10 is movable between an operational position and a storage position. The operational position is illustrated in FIG. 1 and the storage position is illustrated in FIG. 11. When stair assembly 10 is in the operational position, a person "P" is able to climb up or down stair assembly 10 and thereby move between road surface 20 and bed 14 by climbing easily up the steps 30 (FIG. 2) thereof. When stair assembly 10 is in the storage position, person "P" moves with greater difficulty and less safety between road surface 20 and bed 14 in that they must climb up onto the workbed 14 without the assistance of steps and are forced to jump off workbed 14 to return to the road surface 20.

Figure 2:
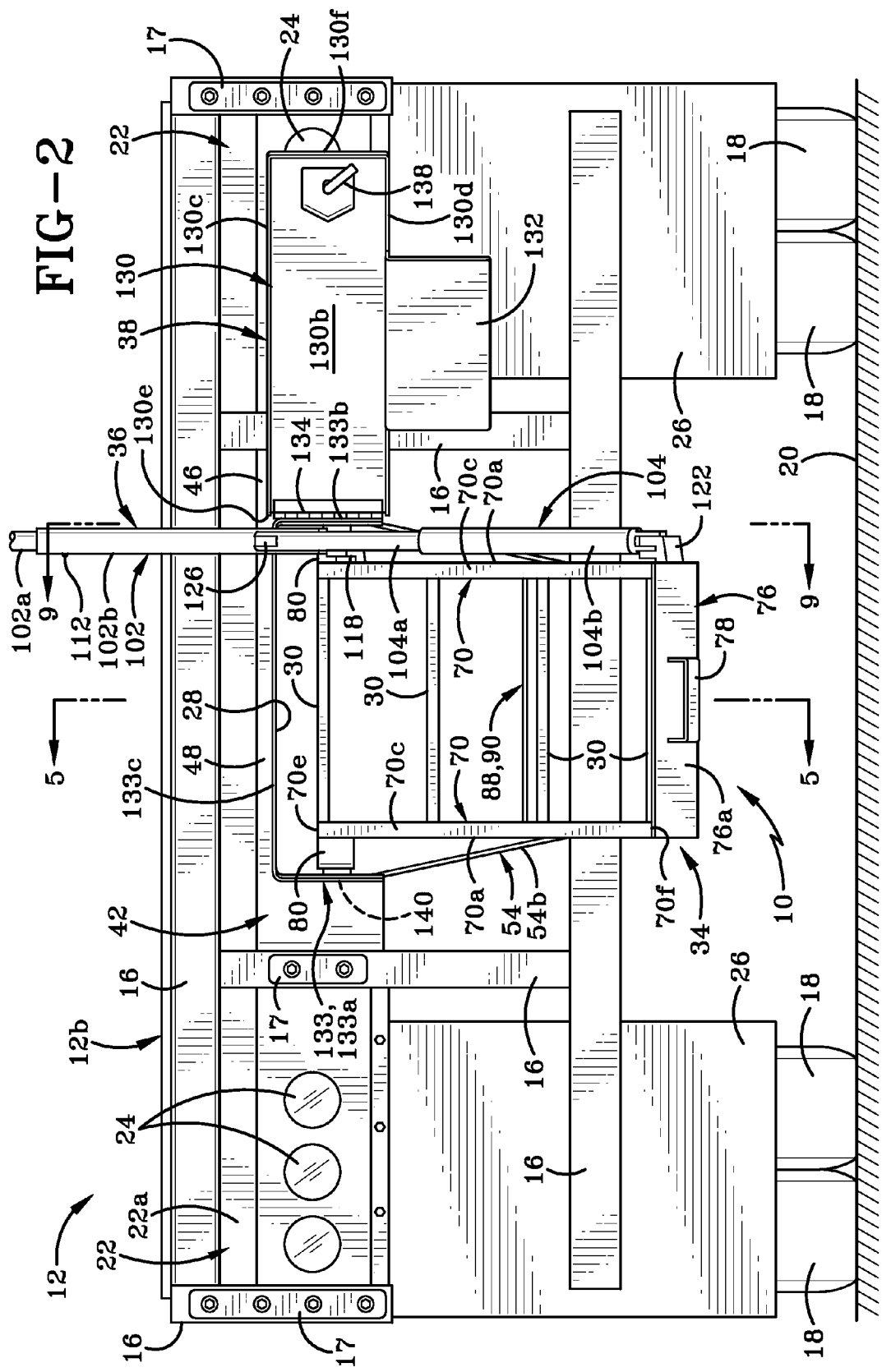
FIG. 2 is a rear view of the trailer showing the stair assembly in the operational position and the handrail assembly in the extended position.

Referring to FIG. 2 and in accordance with an aspect of the invention, stair assembly 10 comprises a track assembly 32, a step assembly 34, a handrail assembly 36, and a door assembly 38, as well as first and second pivot assemblies 86, 88. As will be hereinafter described, track assembly 32 is secured to frame 16, step assembly 34 is engaged with track assembly 32 by first and second pivot assemblies 86, 88, handrail assembly 36 is engaged with step assembly 34, and door assembly 38 is engaged with track assembly 32.

Figure 6:
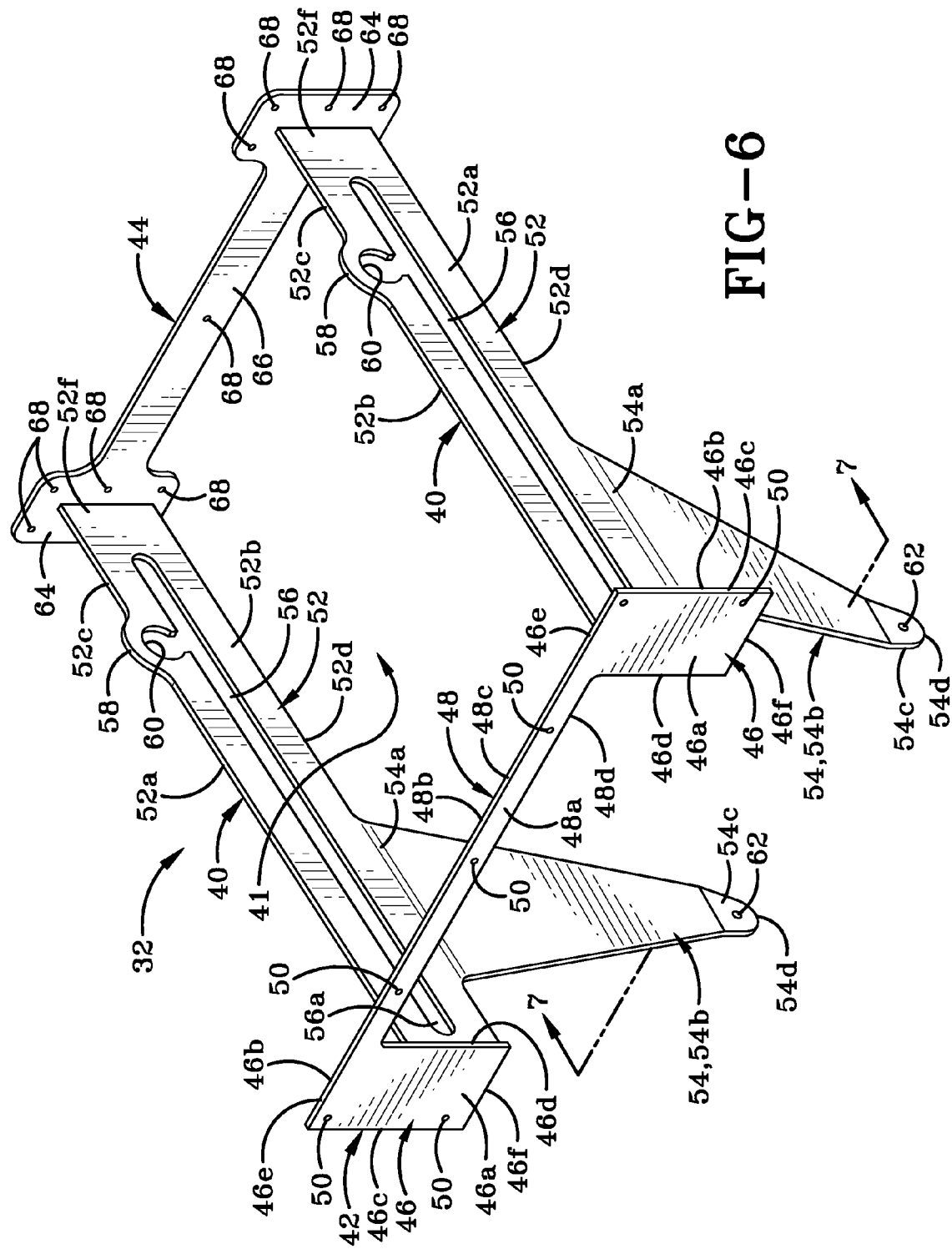
FIG. 6 is a perspective rear view of the track assembly of the stair assembly with all other components removed for clarity.
Figure 7:
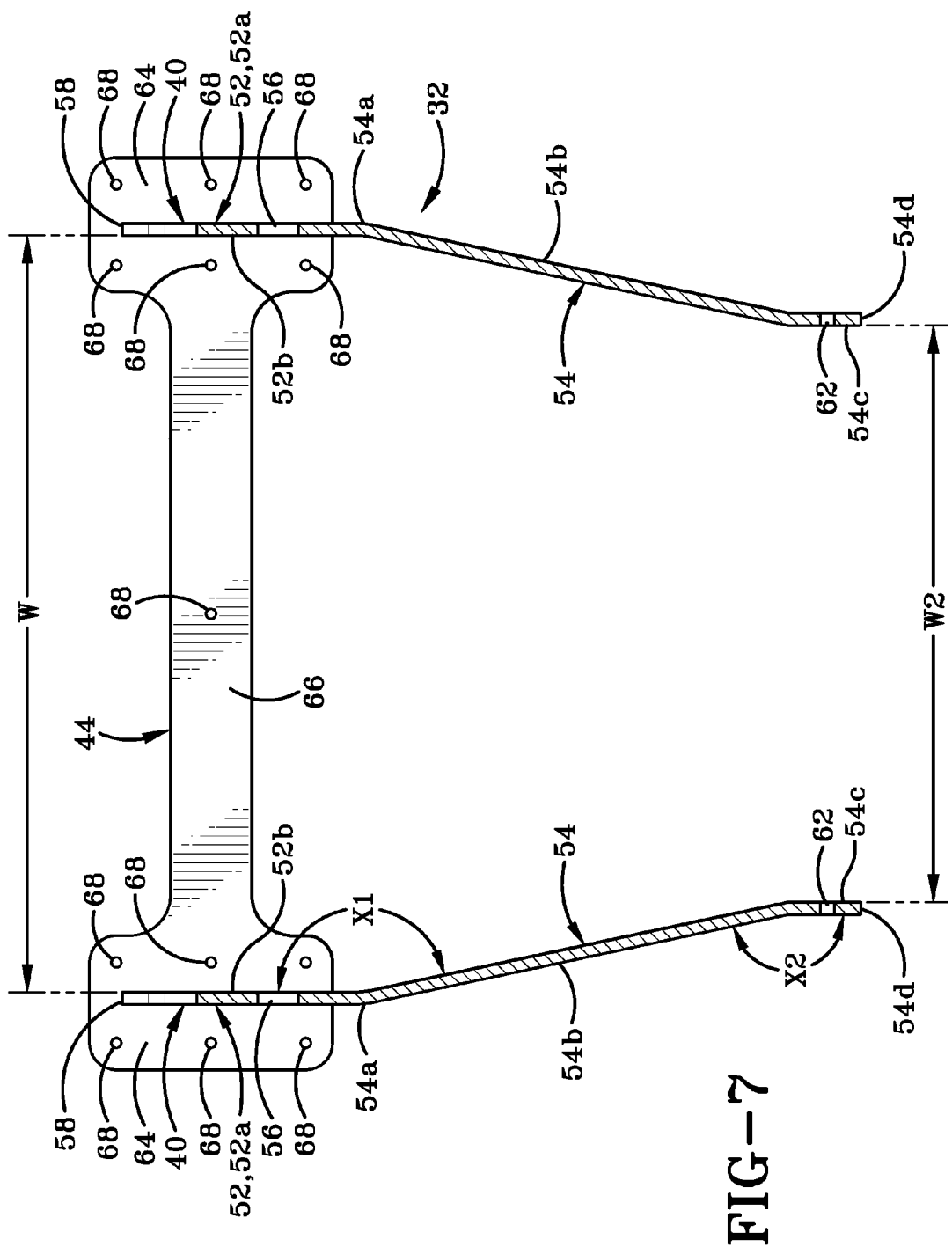
FIG. 7 is a rear view of the track assembly taken through line 7-7 of FIG. 6.
Figure 8:
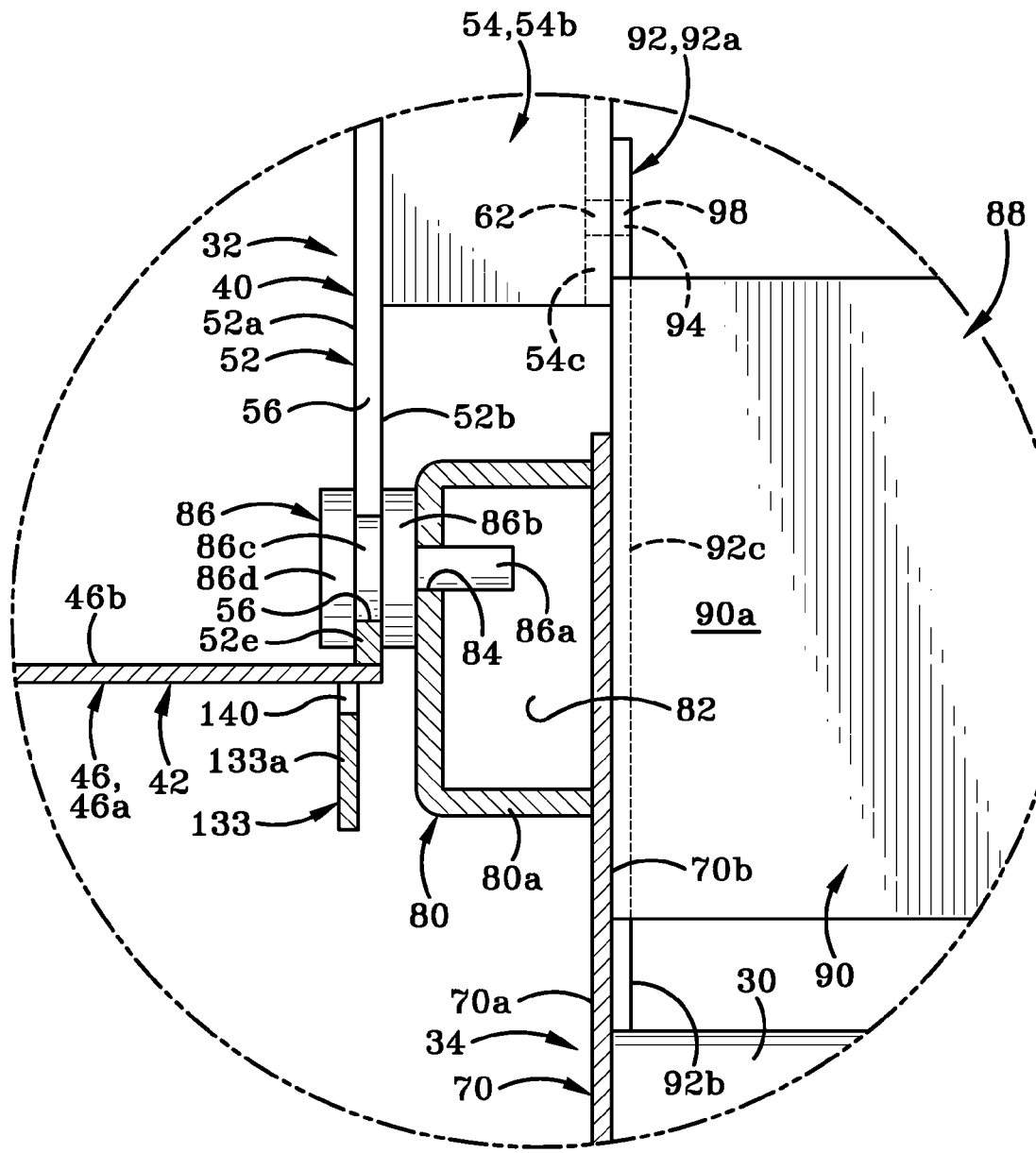
FIG. 8 is a top view of the engagement of a roller of the stair assembly sub-assembly and the track assembly taken through line 8-8 of FIG. 5.

Track assembly 32 is shown by itself in FIGS. 6 and 7. Track assembly 32 includes two spaced apart tracks, a sill 42, and a plate 44 that are all engaged with each other. Sill 42 and plate 44 are disposed substantially at right angles relative to tracks 40. Tracks 40, sill 42 and plate 44 bound and define a retaining space 41 therebetween. Sill 42 is configured to be secured to a region of frame 16 and/or rear panel 22. In particular, sill 42 is disposed in abutting contact with the exterior surface 22a of rear panel 22 (FIG. 2). The positioning of sill 42 ensures that step assembly is strong and stable and as step assembly 34 is moved through aperture 28 and into retaining space 41, as will be hereinafter described, rear panel 22 will substantially resist the inward force of this movement and will ensure that step assembly moves smoothly into region 41.

Sill 42 is generally U-shaped (FIG. 6) and comprises a pair of sill members 46 which are each connected to opposite ends of a crossbar 48. Sill members 46 and crossbar 48 are substantially planar members which are coplanar with each other. Sill members 46 are substantially identical. Each sill member 46 is generally rectangular in shape, having an exterior surface 46a, an interior surface 46b (FIG. 5), an outside edge 46c (FIG. 6), an inside edge 46d, a first end 46e and a second end 46f. Crossbar 48 is an elongate planar member that extends between the inside edges 46c of the two sill members 46 and has an exterior surface 48a that is coplanar with exterior surface 46a, and an interior surface 48b that is coplanar with interior surface 46b. Crossbar 48 further includes a first end 48c that is coplanar with first ends 46e and a second end 48d that is spaced a distance inwardly from second ends 46f of sill members 46. While inside edges 46d and second end 48d are shown as being straight edges, it will be understood that they may be shaped and notched in order to be complementary to aperture 28 and/or to portions of door assembly 38. Sill 42 preferably is manufactured from a suitable metal and is configured either a single unit or sill members 46 and crossbar 48 are single members that are welded together or otherwise joined. Sill 42 is secured to exterior surface 22a of rear panel 22 in any suitable means such as nuts and bolts, rivets, welding, or adhesives. As illustrated, sill 42 is configured to be secured to rear panel 22 by a plurality of nuts and bolts (not shown), and to that end, a plurality of holes 50 are provided therein through which the bolts may be received. When sill 42 is secured to frame 16 and/or rear panel 22 it serves to strengthen and reinforce those portions of frame 16 and/or rear panel 22 which define aperture 28.

Figure 3:
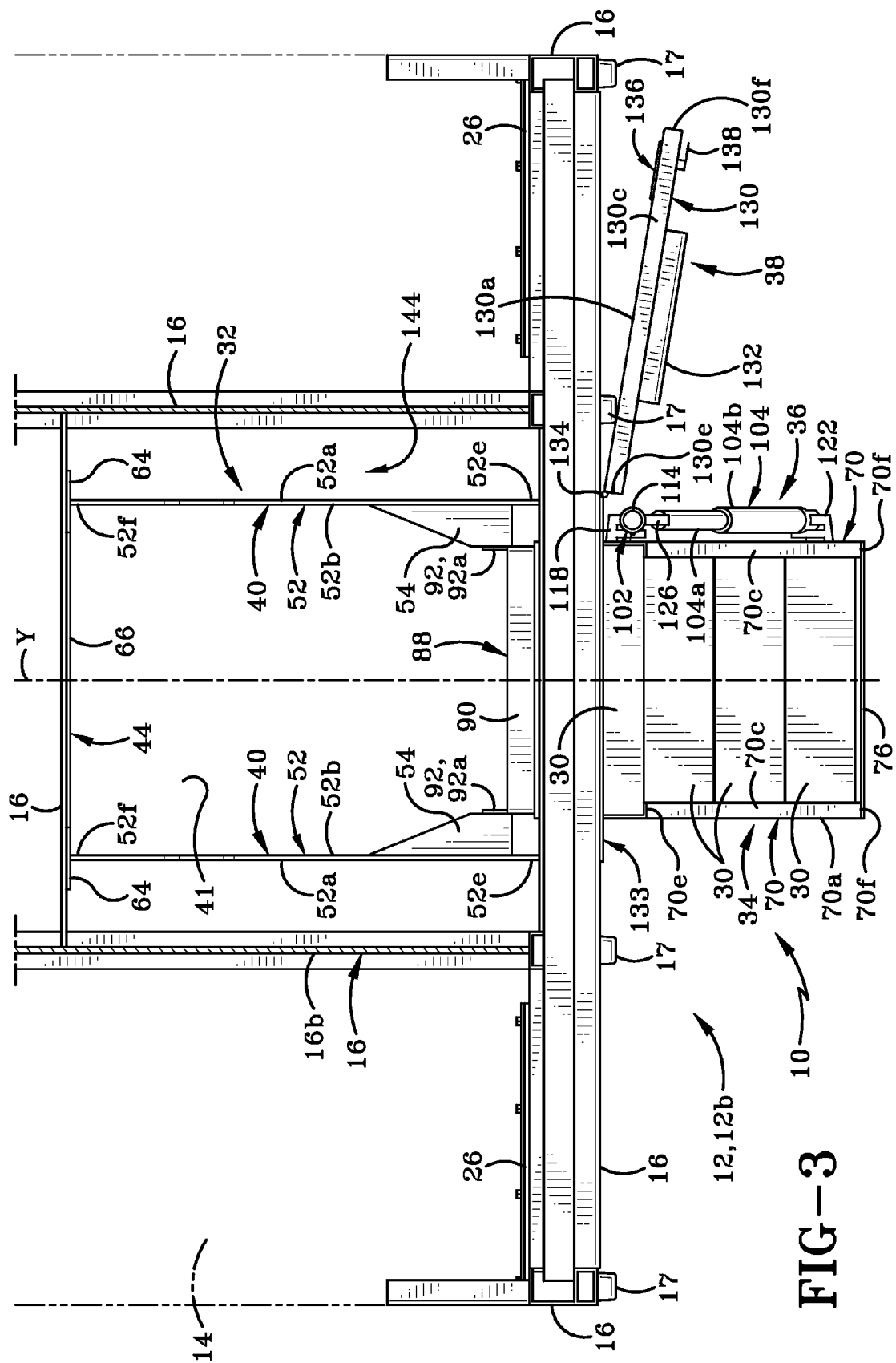
FIG. 3 is a top view of a back region of the trailer showing the stair assembly in the operational position and the handrail assembly in the extended position.

Each track 40 extends inwardly away from interior surfaces 46b, 48b of sill 42 and away from interior surface 22b of rear panel 22. Tracks 40 are oriented substantially at right angles to the interior surfaces 46b of sill 42 and are disposed generally parallel to each other. Tracks 40 each comprise a guide portion 52 and a pivot support 54. As best seen in FIG. 3, each guide portion 52 is an elongate, generally planar member that extends substantially parallel to longitudinal axis "Y" of track assembly 32. Each guide portion 52 has an exterior surface 52a, an interior surface 52b, a top 52c (FIG. 5), a bottom 52d, a first end 52e and a second end 52f. First end 52e is engaged with sill 42 and second end 52f is engaged with plate 44 in any suitable manner. For example, first and second ends 52e, 52f may be welded to sill 42 and plate 44. Although not shown herein, first and second ends 52e, 52f may, alternatively, be specially shaped and interlockingly engaged in complementary notched regions in sill 42 and plate 44.

In accordance with an aspect of the invention, a longitudinally aligned slot 56 (FIG. 5) is defined in each guide portion 52. Slot 56 originates a distance inwardly from first end 52e of guide portion 52 and terminates a distance inwardly from second end 52f thereof. Slot 56 extends between exterior and interior surfaces 52a, 52b and is of a height "H2" and length "L". Top 52c of guide portion 52 includes a generally semicircular protrusion 58 in a region proximate plate 44. A generally C-shaped aperture 60 is defined within protrusion 58 and is in communication with slot 56. The purpose of slot 56 and aperture 60 will be described later herein.

Each pivot support 54 is a generally triangular region when viewed from the side and is integral with and extends downwardly from bottom 52d of one of guide portions 52. Alternatively, pivot support 54 may be manufactured as a separate component that is welded or otherwise secured to its associated guide portion 52. As best seen in FIG. 7, each pivot support 54 is not coplanar along its width and length with its associate guide portion 52. Instead, when pivot support 54 is viewed from the front or rear, it comprises an upper region 54a, a middle region 54b and a lower region 54c. Upper region 54a is generally aligned with interior surface 52b of guide portion 52 and is therefore disposed at a first angle of about 0° or 180° to guide portion 52. Middle region 46 is disposed at a second angle "X1" relative to upper region 54a, and lower region 54c is disposed at a third angle "X2" relative to middle region 54b. Second angle "X1" is from around 160° to 175° and preferably is 168°, and third angle "X2" is from around 160° to 175° and preferably is 168°. Overall, each pivot support 54 is displaced around 12° relative to its associate guide portion 52. The configuration of pivot support 54 is such that the width between the upper regions 54a of the two opposed pivot supports 54 is substantially the same as the width "W". The two middle regions 54b of the opposed pivot supports 54 extend generally toward each other so the distance between them progressively narrows. Finally, the lower regions 54 are disposed generally parallel to the upper regions 54 but the distance "W2" between them is less than "W". In the preferred embodiment of the invention, the width "W" is about 29" and the width "W2" is about 22". Each pivot support 54 terminates at its lowermost end in a tip 54d. Tip 54d preferably is curved in shape and has a radius of curvature of about 1¼". Tip 54d defines a hole 62 (FIGS. 6&7) therein which extends between an interior surface and exterior surface of pivot support 54 such that hole 62 is substantially at right angles to the longitudinal axis "Y" of track assembly 32.

Plate 44 engages second ends 52f of tracks 40. Plate 44 comprises a generally I-shaped member when viewed from the front or rear. Plate 44 includes first and second plate members 64 and a web 66 that extends between plate members 64. Second ends 52f are disposed substantially at right angles to plate members 64 and are secured thereto in any suitable manner such as welding or engaging protrusions (not shown) on second ends 52f in complementary notches (not shown) on plate members 64. Plate 44 is secured to any suitable portion of frame 16 by fasteners such as nuts and bolts or rivets, or by welding, adhesive or any suitable means. As illustrated in FIGS. 6&7, plate members 64 and web 66 are provided with holes 68 therein and through which bolts (not shown) may be inserted to engage a portion of frame 16. Holes 68 extend between front and rear surfaces of plate 44 and are aligned with longitudinal axis "Y". Plate 44 gives strength and rigidity to track assembly 32. Both plate 44 and sill member 46 ensure that track assembly 32 is sufficiently secured to frame 16 so that track assembly 32 will adequately support step assembly 34 when in the storage position and the vehicle 12 is moving.

Figure 4:
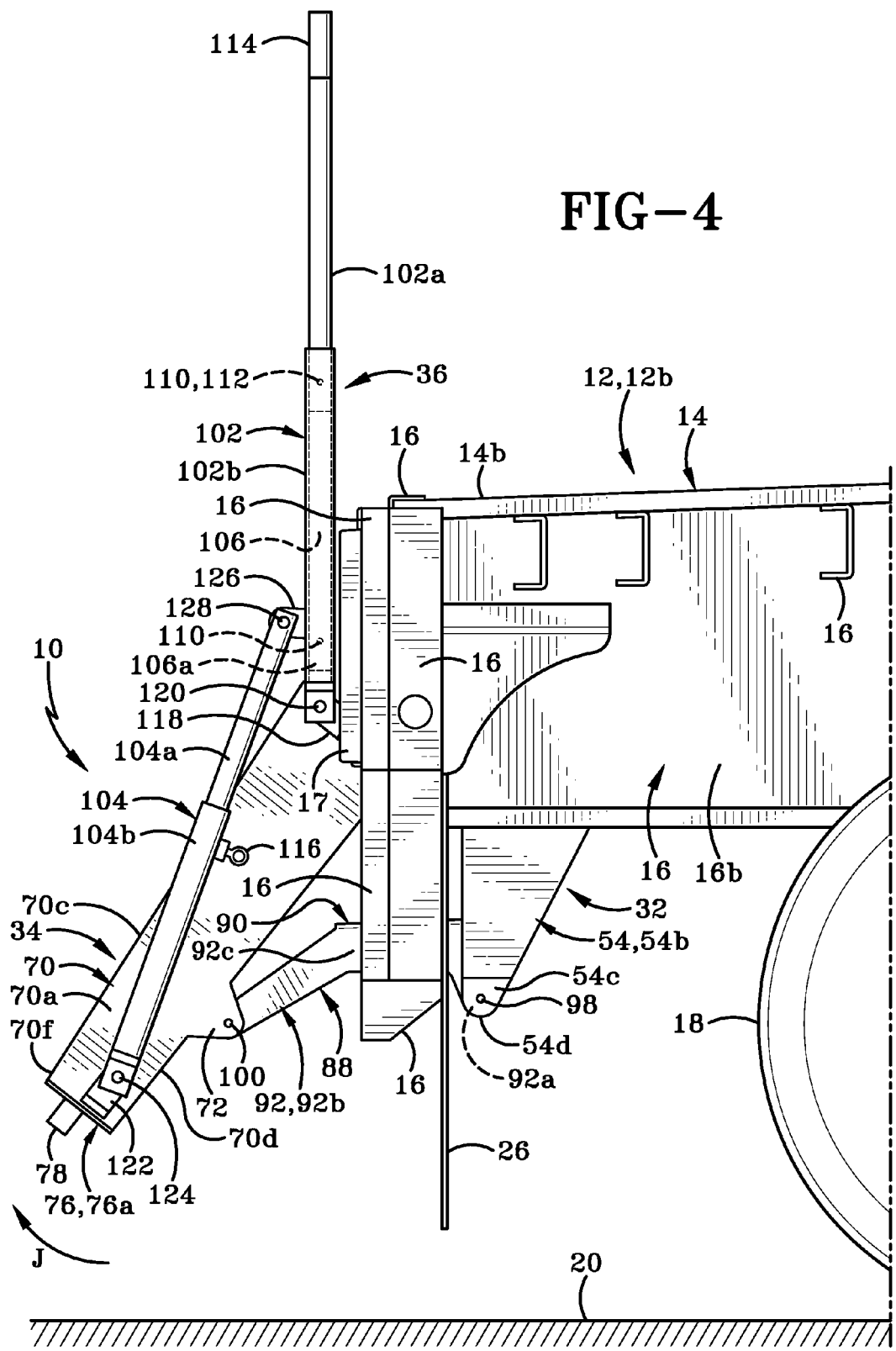
FIG. 4 is a right side view of the back region of the trailer shown in FIG. 3.

In accordance with an aspect of the invention and as shown in FIG. 2, step assembly 34 includes a pair of spaced apart and parallel rails 70. Each rail 70 is a generally planar member having an exterior side 70a, an interior side 70b, a first edge 70c, a second edge 70d (FIG. 4), a first end 70e and a second end 70f. First end 70e is disposed at a first angle relative to first edge 70c. Preferably, that first angle is about 235°. Essentially, this means that when step assembly 34 is disposed in the operational position, first end 70e will be generally horizontally oriented and substantially parallel to the ground surface 20 upon which step assembly 34 rests. Second end 70f is disposed at an angle of about 265° relative to first edge 70c. Additionally, as best seen in FIG. 4, first edge 70c is not parallel to second edge 70d. Instead, the distance between first and second edges 70c, 70d narrows as you move from first end 70e toward second end 70f. A generally triangular protrusion 72 (FIG. 4) extends outwardly from second edge 70d of each rail 70. Protrusion 72 is generally coplanar with rail so that an exterior surface of protrusion 72 is generally aligned with exterior surface 70a, and an interior surface of protrusion 72 is generally aligned with interior surface 70b. A hole 74 is defined in protrusion 72 and extends between the interior and exterior surfaces thereof.

A plurality of steps 30 extend between the rails 70. Specifically, each step 30 extends between the interior surfaces 70b of the two rails. Each step 30 is fixedly secured to each rail 70 and steps 30 are spaced at regular intervals from each other along the length of rails 70. Each step 30 has a first surface 30a and a second surface 30b. First surface 30a may be provided with a textured surface to substantially prevent person "P" from slipping thereon when climbing up and down steps 30. It will also be noted that steps 30 are configured so that they are substantially horizontal when step assembly 34 is in the operational position shown in FIG. 2. A base plate 76 extends between second ends 70f of the two rails 70 and is disposed generally at right angles thereto. In accordance with yet another aspect of the invention, a handle 78 extends outwardly from a central region of an exterior surface 76a of base plate 76. Exterior surface 76a is that surface which will be disposed adjacent door assembly 38 when stair assembly 10 is in the storage position and is adjacent road surface 20 when staircase assembly 10 is in the operational position.

A first pivot assembly and a second pivot assembly secures step assembly 34 to track assembly 32 and enables step assembly 34 to move between the storage and operational positions. The first pivot assembly comprises a pair of mounting brackets 80 and first and second rollers 86. Each mounting bracket 80 is secured to exterior surface 70a of one of the first and second rails 70. Mounting bracket 80 has a generally U-shaped peripheral wall 80a that is welded to exterior surface 70a so that a chamber 82 is defined between wall 80a and a portion of exterior surface 70a. An aperture 84 is defined in peripheral wall 80a in a region opposite exterior surface 70a. The shaft 86a of a flanged roller 86 is received through aperture 84 in such a way that roller 86 is able to rotate about an axis that extends through shaft 86a. Roller 86 includes first, second, and third circular regions 86b, 86c 86d, where second region 86c is of a diameter that is slightly less than height "H2" of slot 56 in track 40. The diameter of first and third circular regions 86b, 86d is slightly smaller than that of aperture 60 in track 40. When step assembly 34 is engaged with track assembly 32, third region 86d of each roller 86 is inserted through aperture 60 of one of tracks 40. Step assembly 34 is then moved slightly downwardly so that second region 86c of each roller 86 enters slot 56 of the associated tracks. Step assembly 34 is then moved toward the first ends 52e of tracks 40. The larger diameter first and third regions 86b, 86d keep step assembly 34 engaged with track assembly 32 and limit the step assembly's lateral motion relative to track assembly 32. It will be understood that mounting bracket 80 may be omitted from stair assembly 10 and roller 86 may be then secured directly to the exterior surface 70a of one of rails 70. However, mounting brackets 80 preferably are utilized as they create a space between interior surfaces 40a of tracks 40 and exterior surfaces 70a of rails 70, thereby enabling step assembly 34 to move more easily relative to track assembly 32.

Figure 5:
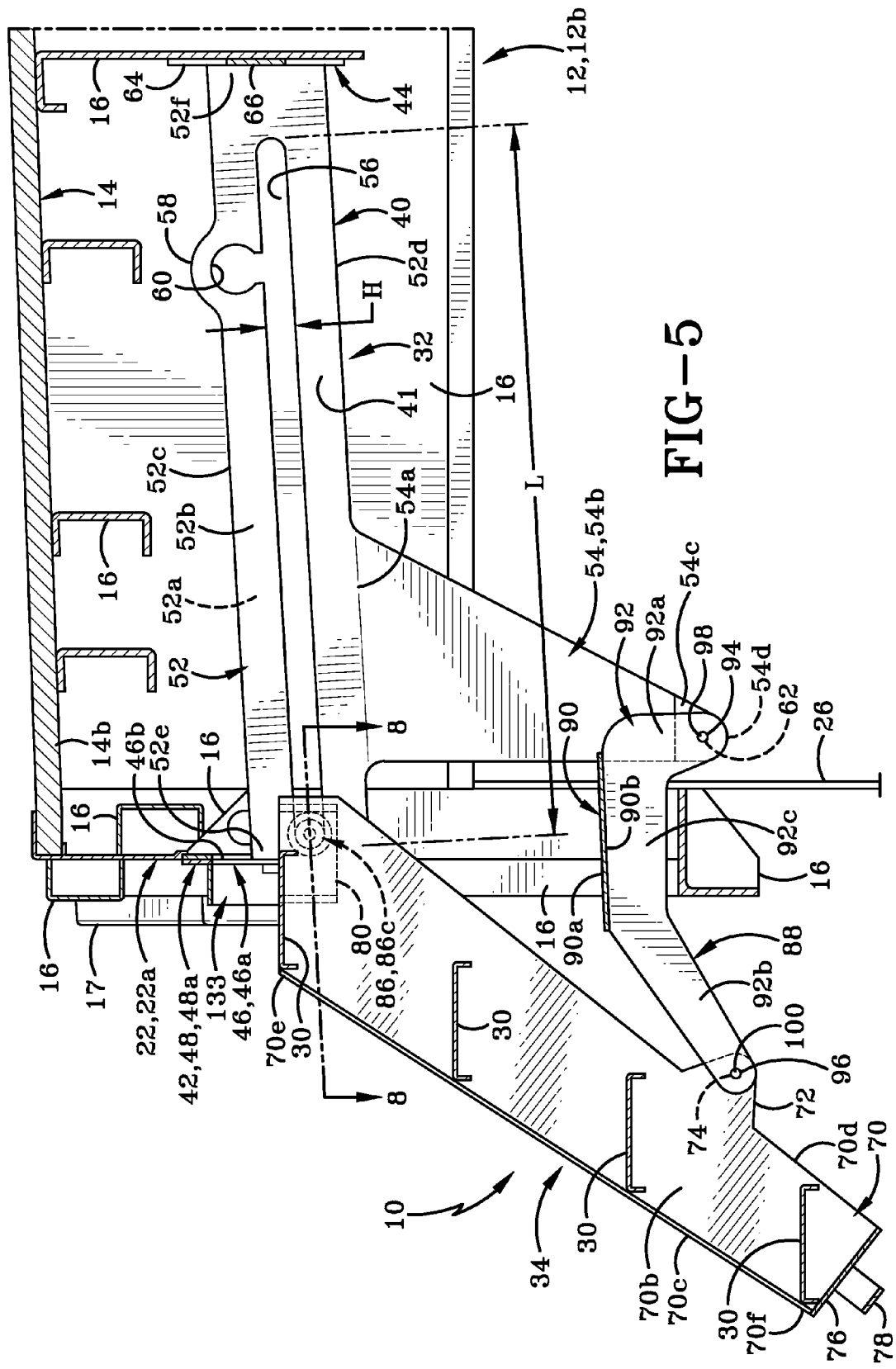
FIG. 5 is a right side view of the stair assembly and a portion of the trailer taken through line 5-5 of FIG. 2.
Figure 5A:
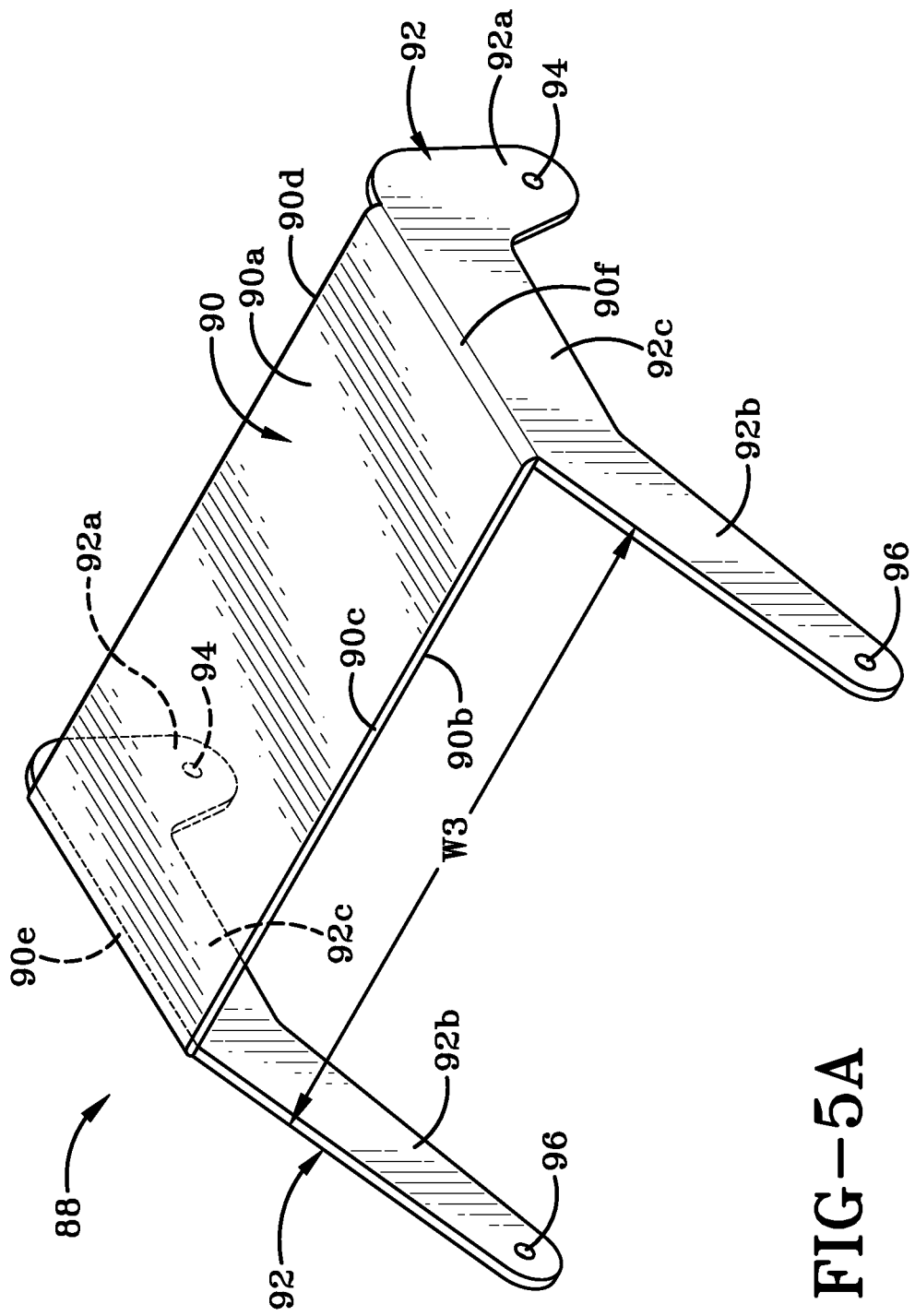
FIG. 5A is a perspective view of a first pivot assembly which secures the track assembly and step assembly together shown with all other components removed for clarity.

As indicated previously, second pivot assembly 88 (FIG. 5A) also secures step assembly 34 to track assembly 32. In particular, second pivot assembly 88 engages one or both rails 70 to one or both pivot support 54 of track assembly 32. Second pivot assembly 88 includes a base 90 and at least one but preferably two, leg members 92. Base 90 is generally rectangular in shape and is substantially planar in nature. Base 90 has a first surface 90a, a second surface 90b, a first edge 90c, a second edge 90d, and first and second ends 90e, 90f. First and second edges 90c, 90d, and first and second ends 90e, 90f extend between first and second surfaces 90a, 90b. A first leg member 92 extends downwardly away from first end 90e and a second leg member 92 extends downwardly from second end 90f. Leg members 92 are identical in configuration and are disposed generally parallel to each other. Furthermore, leg members 92 are disposed substantially at right angles to first and second surfaces 90a, 90b of base 90 and are aligned substantially parallel to longitudinal axis "Y" of track assembly 32 when step assembly 34 is engaged therewith. Each of the first and second leg members 92 includes a first region 92a and a second region 92b. The first regions 92a of the first and second leg members 92 are complementary in shape, size and position, and the second regions 92b of the first and second leg members 92 are complementary in shape, size and position. An intermediate region 92c connects first and second regions 92a, 92b on each of the first and second leg members 92. Both regions 92a, 92b have gently rounded ends remote from base 90. A first aperture 94 is defined in each first region 92a and a second aperture 96 is defined in each second region 92b. Leg members 92 are spaced a distance apart from each other. In particular, the distance between first regions 92a is substantially equal to the distance between lower regions 54c of pivot supports 54 of track assembly 32, i.e., the distance is equivalent to "W2". Additionally, the distance between second regions 92b is substantially equal to the distance between protrusions 72 on rails 70 of step assembly 34.

When second pivot assembly 88 connects step assembly 34 to track assembly 32, a first pivot pin 98 extends through each aligned set of hole 62 in pivot support 54 and first aperture 94 in first region 92a. A second pivot pin 100 extends through each aligned set of hole 74 in protrusion 72 of each rail 70 and second aperture 96 in each second region 92b. It will be understood that a single first pivot pin 98 can extend through both sets of aligned holes 62 and first aperture 94 or two separate first pivot pins can be used for this purpose. Similarly, a single second pivot pin 100 can extend through both sets of aligned holes 74 and second apertures 96 or to separate pivot pins can be used for this purpose.

Second pivot assembly 88 is effectively both a mechanism for connecting track assembly 32 and step assembly 34 together and enabling them to pivot relative to each other (along with rollers 86) but the second pivot assembly 88 also serves as a bracing member, strengthening and supporting step assembly 34 so that the person can climb up and down the stairs in relative safety. The configuration of pivot support 88 also aids in distributing forces on step assembly 34 during use to track assembly 32 and to frame 16. Pivot support 88 also substantially reduces any lateral motion in step assembly when it is used by the person.

Figure 9:
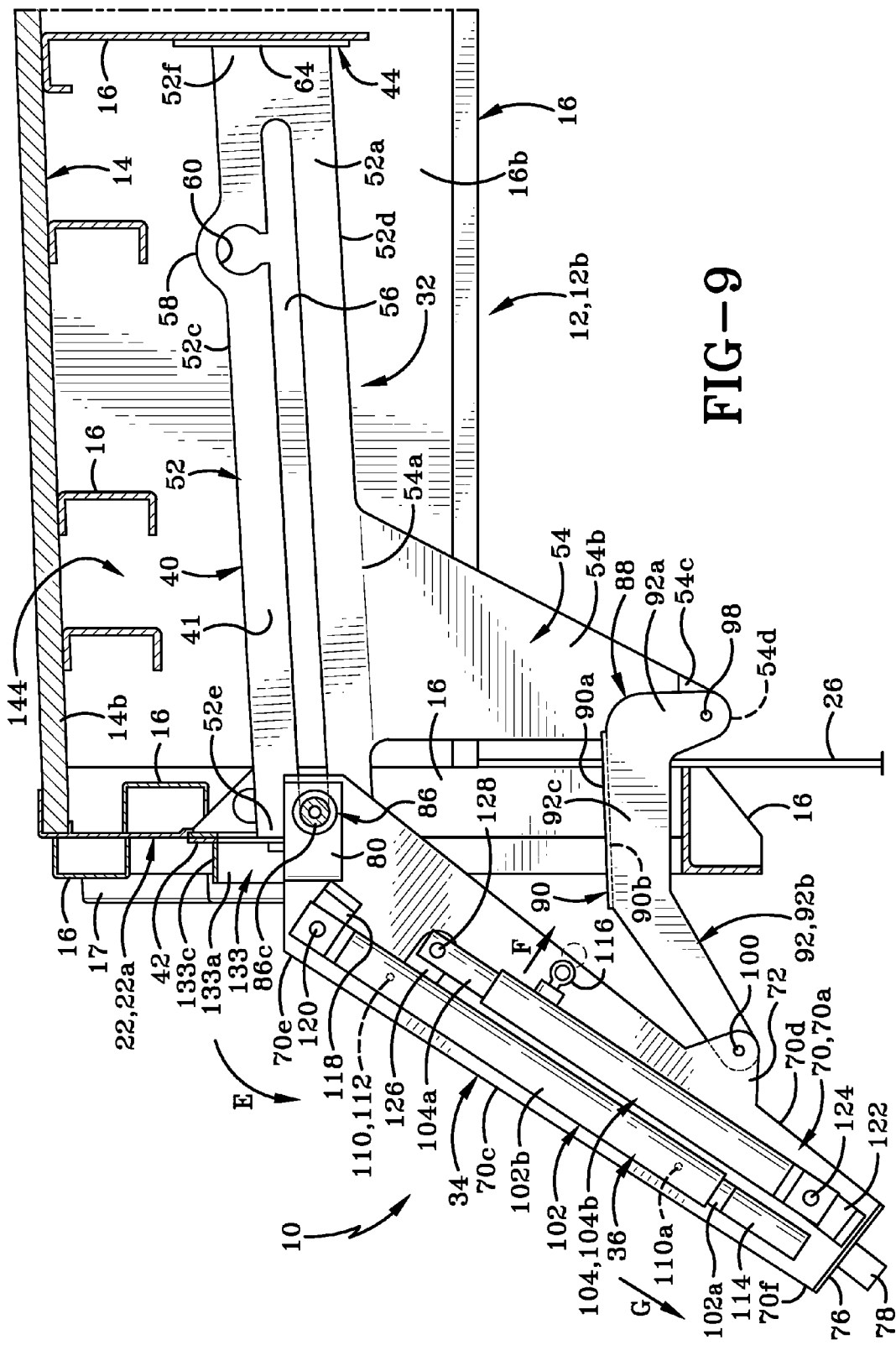
FIG. 9 is a right side view of the stair assembly and portion of the trailer taken through line 9-9 of FIG. 2 showing the stair assembly in the operation position and the handrail assembly in a collapsed position.

In accordance with yet another aspect of the invention, stair assembly 10 includes handrail assembly 36 which comprises a bar 102 and a support arm 104. Bar 102 includes a first bar member 102a and a second bar member 102b (FIG. 4). Both of first and second bar members 102a, 102b are generally hollow, cylindrical components that are configured to telescope relative to each other. In particular, second bar member 102b defines a bore 106 therein that is of a size complementary to an exterior diameter of first bar member 102a. An end region of first bar member 102a is received in bore 106. Although not shown herein, a spring may be disposed between the end region of first bar member 102a and an interior end 106a of bore 106. Two spaced-apart apertures 110 are defined in the exterior wall of second bar member 102b and a depressible button 112 extends outwardly from the exterior surface of the end region of first bar member 102a. Button 112 is selectively engageable in one of apertures 110 as handrail assembly 36 is moved between an extended position (FIG. 4) and a collapsed position (FIG. 9). A hand grip 114 is provided at the outermost end of first bar member 102a.

Support arm 104 comprises a first and second arm member 104a, 104b that are similarly configured like bar 102 to telescope relative to each other as handrail assembly 36 is moved between the extended and collapsed positions. Each of the first and second arm members 104a, 104b is generally cylindrical and at least second arm member 104b includes a bore (not shown) that is sized to receive an end region of first arm member 104a therein. Support arm 104 includes a pin 116 that can be pulled slightly outwardly through an aperture (not shown) in second arm member 104 to permit telescoping movement of first and second arm members 104a, 104b. Pin 116 can be of any suitable construction such as being spring loaded to clampingly engage the exterior surface of first arm member 104 to lock first and second arm members 104a, 104b together.

Figure 10:
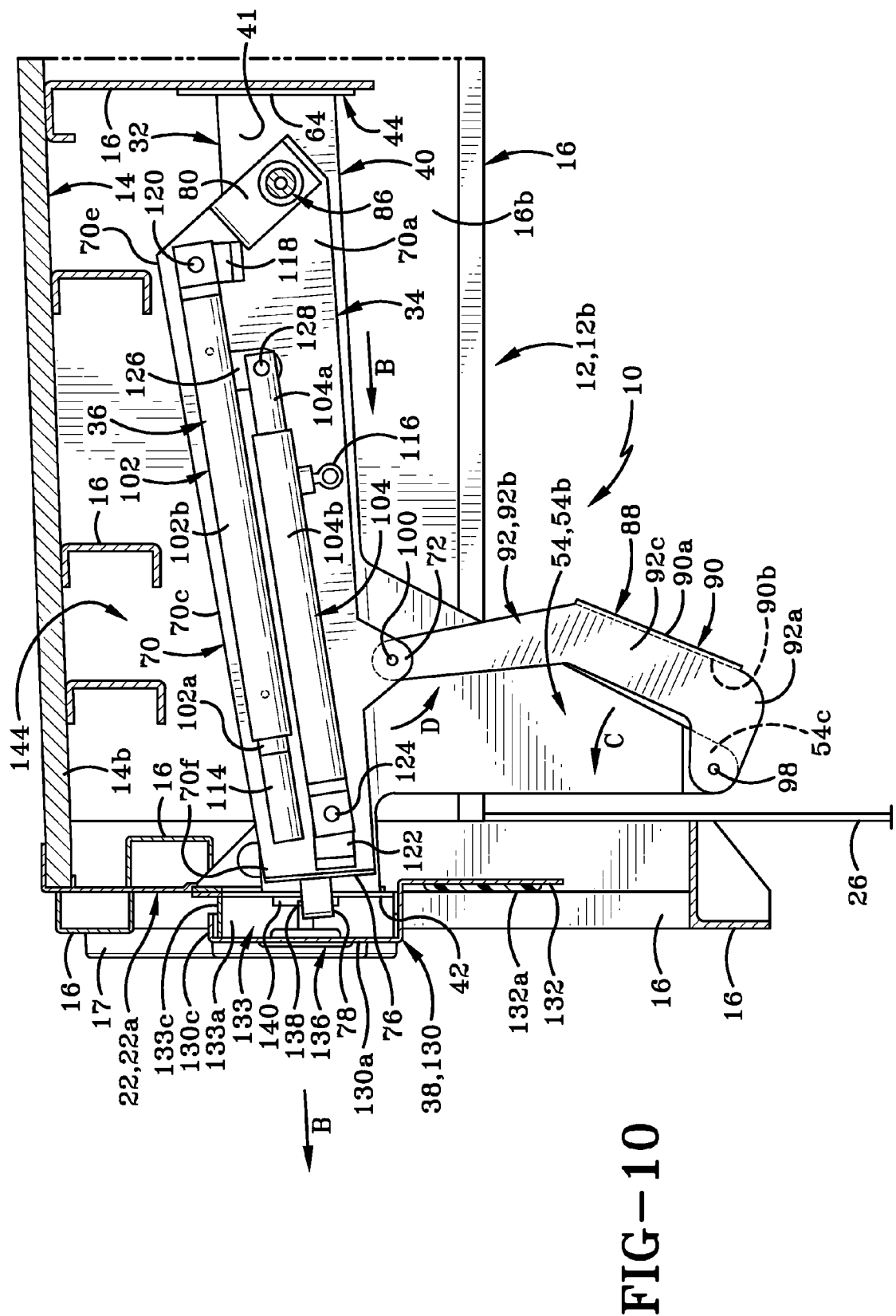
FIG. 10 is a right side cross-sectional view of the back region of the trailer showing the stair assembly in a storage position.

A first clevis bracket 118 having a first pivot pin 120 secures second bar member 102b to step assembly 34, and a second clevis bracket 122 having a second pivot pin 124 secures second arm member 104b to step assembly 34. First pivot pin 120 engages first end 70e of rail 70 proximate mounting bracket 80 as best seen in FIG. 10. Second pivot pin 124 engages second end 70f of rail 70. A third clevis bracket 126 is provided on second bar member 102b and a pivot pin 128 secures second arm member 102b to first arm member 104a.

Referring to FIG. 2 and in accordance with yet another aspect of the invention, door assembly 38 includes a door 130 and a license plate flange 132. Door assembly 38 further includes a door relief 133 by a hinge 134. Specifically, door relief 133 is generally U-shaped and includes a first side 133a, a second side 133b, and a top portion 133 that extends between first and second sides 133a, 133b. Door relief 133 is secured to exterior surfaces 46a, 48a of sill 42 adjacent aperture 28. First side 133a of door relief 133 includes a notched recess 140. Door 130 has an exterior surface 130a, an interior surface 130b, a top end 130c, a bottom end 130d, a first side 130e and a second side 130f. Door 130 is complementary shaped to be received in aperture 28 or may be slightly larger than aperture 28 and close off access to the same. A latching mechanism 136 is provided on door 138 to releaseably secure door 138 to sill 42 when door assembly 38 is in the closed position (FIG. 11). Latching mechanism 136 may be of any type known in the art. Preferably, latching mechanism 136 includes a latch 138 (FIG. 3) that is receivable in a recessed region 140 (FIG. 2) when door 138 is closed. A handle 142 on latching mechanism is used to disengage latch 138 from recessed region 140 when door 138 is to be opened. Door assembly 38 is shown in the opened position in FIG. 3 and when door assembly 38 is in this opened position, step assembly 34 may be moved between its storage position and operational position. Door assembly 38 is only able to be moved to the closed position when step assembly 34 is in the storage position.

License plate flange 132 is integral with door 130 and extends downwardly from the bottom end 130d thereof. Flange 132 is generally rectangular in shape and has an exterior surface that is offset relative to the exterior surface of door 130 as is shown in FIG. 10. A license plate 132a is secured to an exterior surface of flange 132.

Stair assembly 10 in accordance with the invention is used in the following manner. When a person "P" needs to climb onto bed 14 of vehicle 12, stair assembly 10 is moved from the storage position (FIGS. 11&12) to the operational position (FIG. 2). In order to do this, handle 142 on door is engaged to move latch 138 out of notched region 140. Door 130 is then rotated from the closed position (FIG. 11) to the open position by rotating it in the direction of arrow "A" (FIG. 12) about hinge 134. Handle 78 on the base plate 76 of step assembly 34 is grasped and step assembly 34 is pulled outwardly from underneath bed 14 in the direction of arrow "B" (FIG. 10). As step assembly 34 moves in this direction, rollers 86 slide along slots 56 in tracks 40 in the direction of arrow "B", second pivot assembly 88 pivots about pivot pin 98 in the direction of arrow "C" and about pivot pin 100 in the direction of arrow "D". Second pivot assembly 88 functions to stabilize step assembly 34 as it glides out of the space 41 and along tracks 40 and substantially prevents lateral motion of step assembly 34 so that rollers 86 do not bind up on track 40 and cease to roll smoothly.

When rollers 86 reach the first end 56a (FIG. 6) of slot 56, they serve as pivot pins and step assembly 34 rotates about an axis that extends along the shafts 86a of rollers 86 and in the direction of arrow "E" (FIG. 9). At this point, step assembly 34 is inclined at an angle relative to the rear end 12b of vehicle 12 and stair assembly 10 is in the operational position. Preferably, the angle of step assembly 34 relative to the rear end 12b is about 51°. As shown in FIG. 1, base plate 76 of step assembly 34 preferably is disposed a distance vertically above road surface 20. This aspect ensures that step assembly 34 will not prematurely contact road surface 20 so that steps 30 are inclined at an angle other than parallel to the road surface 20. If steps 30 are not parallel to road surface 20, the feet of person "P" could possibly slip off steps 30 as they climb onto or off of bed 14 and the person could hurt themselves. When stair assembly 10 is in the operational position, steps 30 are disposed substantially parallel to bed 14 and to road surface 20 thereby presenting a safe surface for the person "P" to step onto.

Once step assembly 34 is in the position shown in FIG. 9, handrail assembly 36 is moved from the collapsed position (FIG. 9) to the extended position (FIG. 4). In order to do this, the person will grasp hand grip 114 with one hand and pull pin 116 outwardly in the direction of arrow "F" with their other hand. While keeping the pin 116 in the pulled out position, the person rotates bar 102 about pivot 120 in the opposite direction of arrow "E". The rotational motion of bar 102 will simultaneously cause support arm 104 to extend in length as first arm member 104a slides out of the bore of second arm member 104b. The person will then release pin 116 which will then move in the opposite direction to arrow "F" and lock first and second arm members 104a, 104b in the fully extended position. The person will then depress button 112 so that it slides into bore 106 of second bar member 102b. First bar member 102a is simultaneously pulled outwardly from bore 106 in the direction of arrow "G". When button 112 encounters aperture 110a (FIG. 9), it will pop through aperture 110a and lock first bar member 102a in the extended position shown in FIG. 4. When handrail assembly 36 is in the fully extended position shown in FIG. 4 it is then safe for the person "P" to grasp onto hand grip 14 as the climb up and down steps 30.

Figure 12:
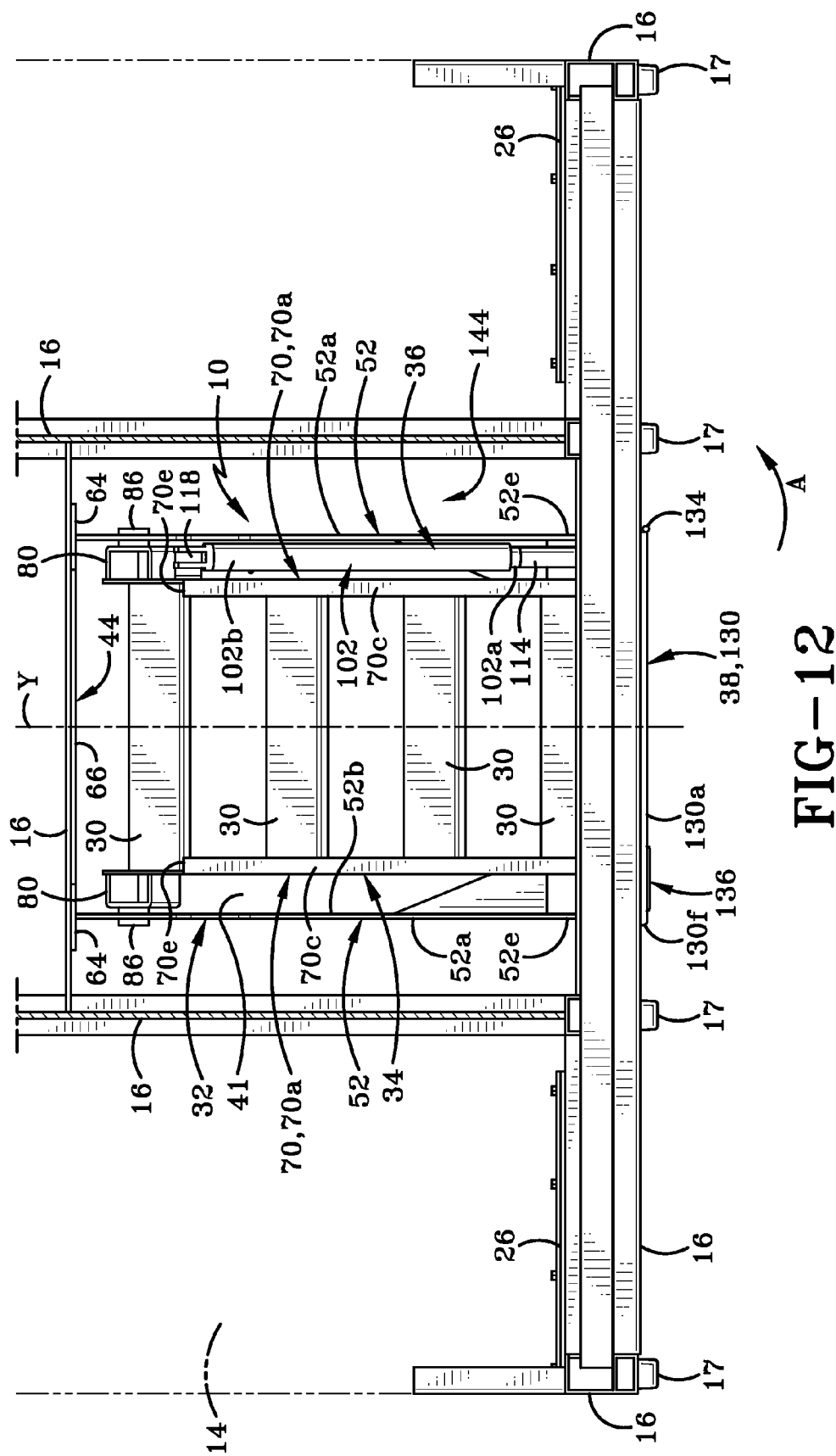
FIG. 12 is a top view of the back region of the trailer with the trailer bed removed for the sake of clarity and showing the stair assembly engaged with the trailer frame and in the storage position.

When the stair assembly 10 is no longer needed to climb onto and off of bed 14, handrail assembly 36 is moved to the collapsed position by reversing the steps set out above. Once handrail assembly 36 is in the collapsed position, the person will grasp handle 78 on step assembly 34 and will lift it upwardly in the direction of arrow "J" (FIG. 4). This motion causes step assembly 34 to pivot about the axis that extends through shafts 86a of rollers 86 and causes second pivot assembly 88 to pivot about pivot pins 100, 98 in the opposite directions to arrows "D" and "C" respectively. When step assembly 34 is disposed generally parallel to road surface 20, it is pushed inwardly toward rear panel 22 in the opposite direction to arrow "B" (FIG. 10). This motion causes rollers 86 to rotate and travel along tracks 40 so that step assembly 34 slides into a compartment 144 defined by a bottom surface 14b of bed 14, tracks 40, plate 42, an interior surface of rear panel 22 and portions of frame 16. When base plate 76 and handle 78 have moved through aperture 28, door assembly 38 is moved from the open position to the closed position by rotating it in the opposite direction of arrow "A (FIG. 12). Handle 142 is manipulated to engage latch 138 in recessed region 140 and vehicle 12 is then ready to travel over road surface 20.

Stair assembly 10 is thus easily accessed and readily deployed when it is needed but is quickly and easily stored when it no longer needed. The positioning of stair assembly 10 beneath bed 14 and in between various frame members 16 ensures that it does not adversely interfere with the airflow around vehicle 12 and is unlikely to contact obstacles that may protrude upwardly from the road surface over which vehicle 12 travels.

Referring now to FIGS. 13-19 and in accordance with an aspect of the invention, there is shown a second embodiment of a stair assembly in accordance with the invention, generally indicated at 210. Stair assembly 210 is mounted to a truck or other vehicle as has been described previously herein with reference to stair assembly 10. Consequently, neither the vehicle or any components thereon will be further described herein with reference to stair assembly 210.

Figure 16:
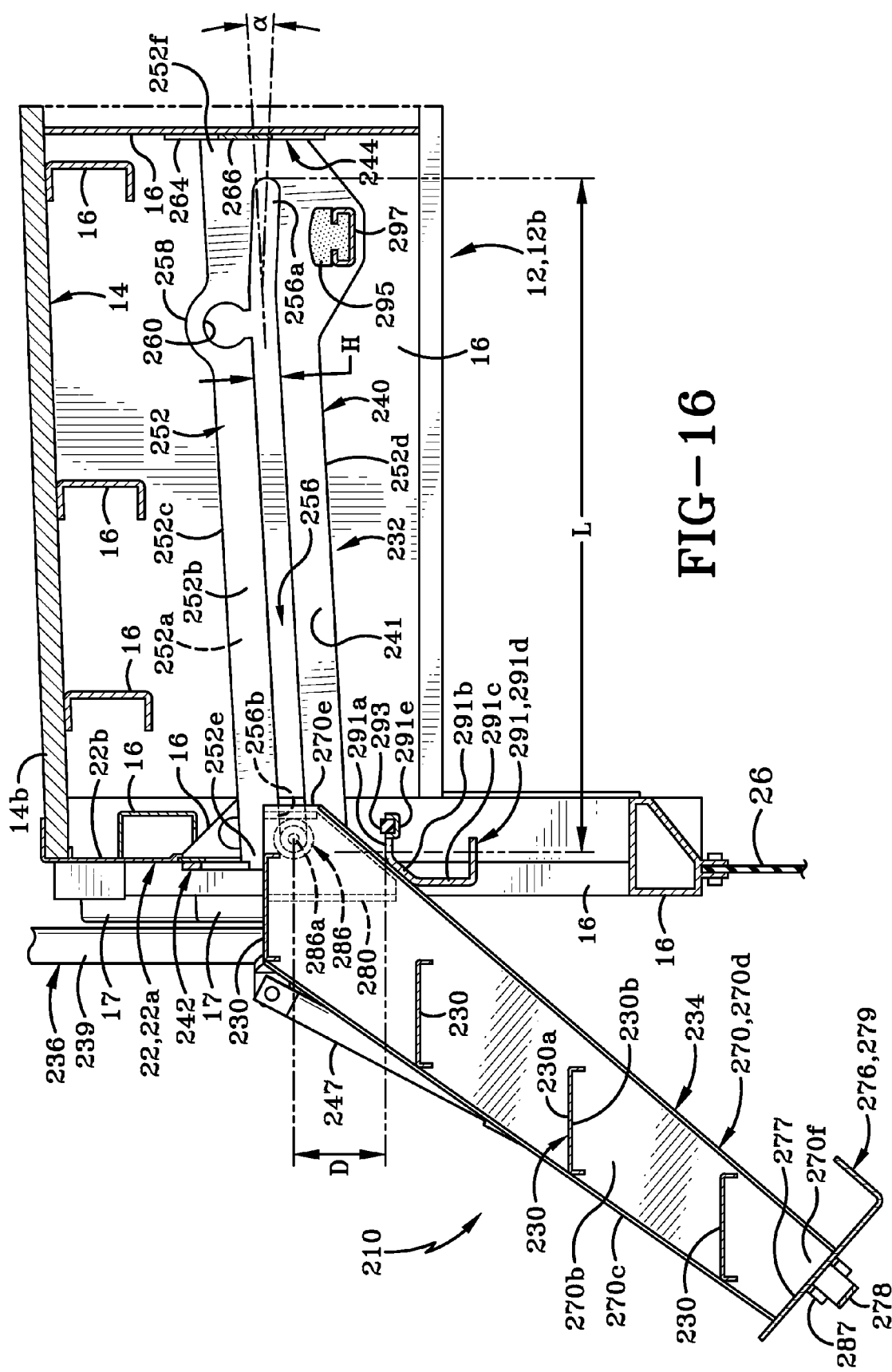
FIG. 16 is a right side view of the stair assembly and a portion of the trailer taken through line 16-16 of FIG. 13.
Figure 17:
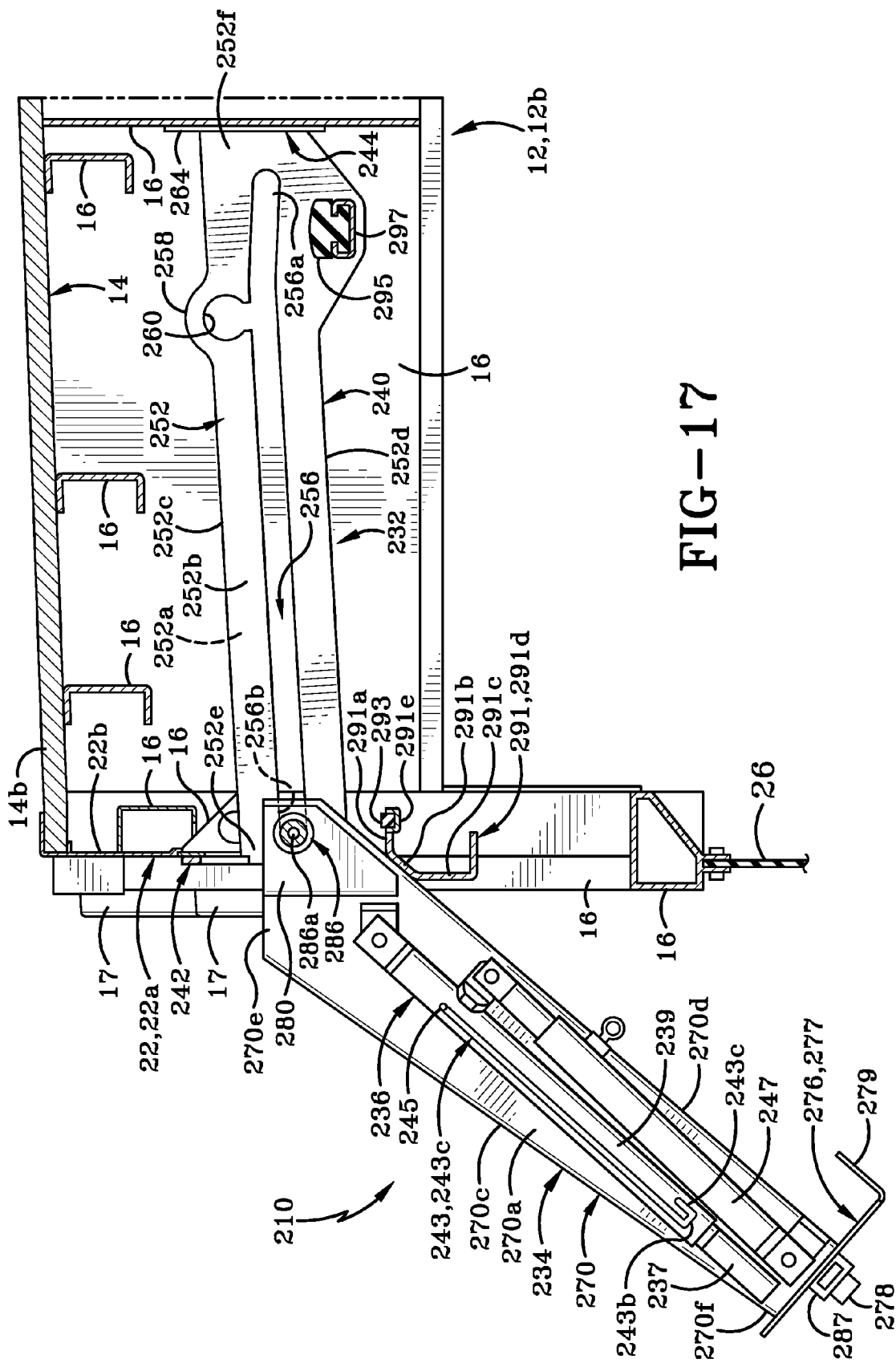
FIG. 17 is a right side view of the stair assembly and portion of the trailer taken through line 17-17 of FIG. 13 showing the stair assembly in the operation position and the handrail assembly in a collapsed position.
Figure 18:
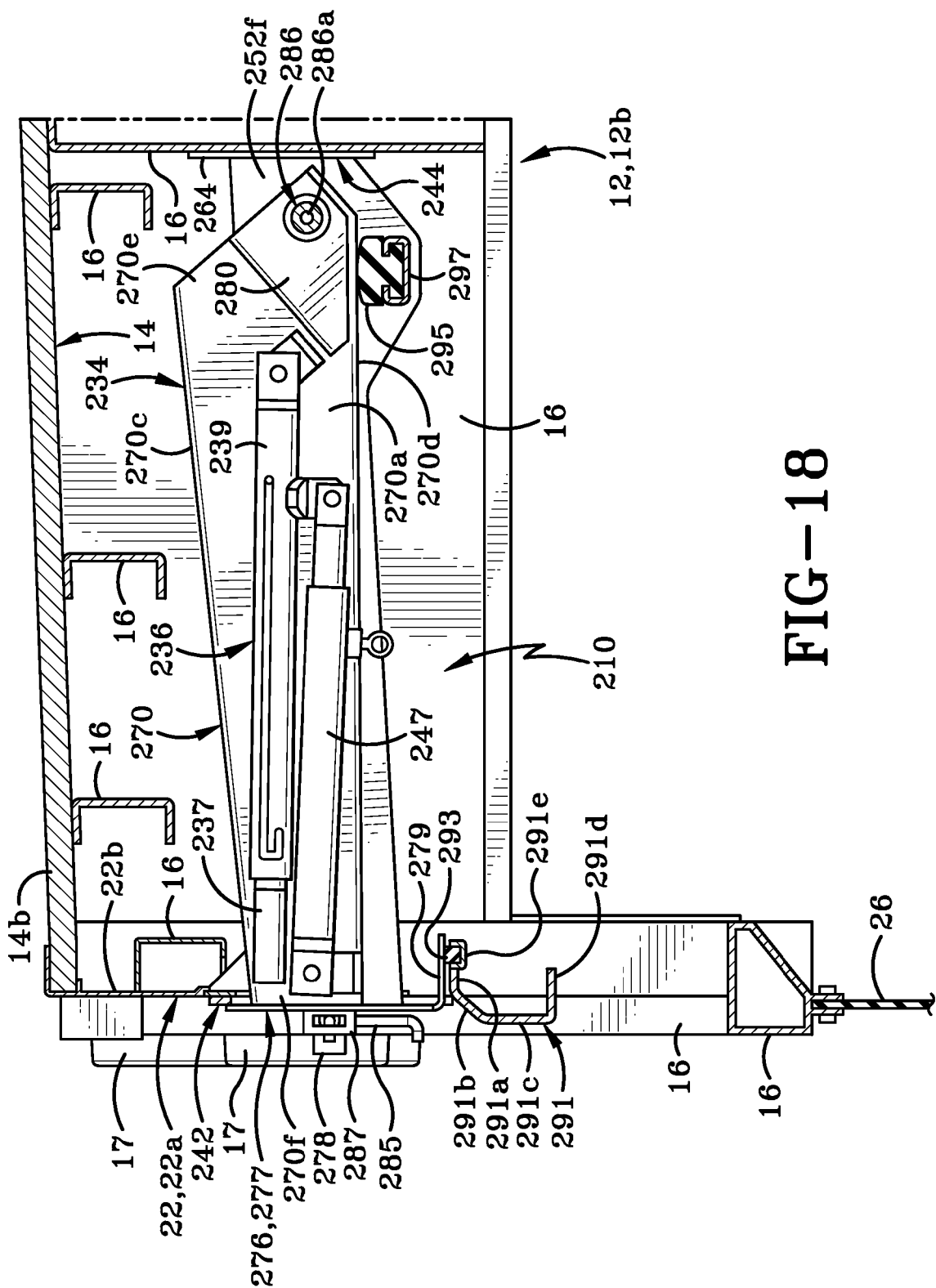
FIG. 18 is a right side cross-sectional view of the back region of the trailer showing the stair assembly in a storage position.

Stair assembly 210 comprises a track assembly 232 (FIG. 14), a step assembly 234, a handrail assembly 236, and a pivot assembly 285 (FIG. 16). (The door assembly 38 and the second pivot assembly 88 of stair assembly 10 do not form part of stair assembly 210.) As will be hereinafter described, track assembly 232 is secured to frame 16 of the vehicle, particularly in a region that is beneath an upper surface of the vehicle's workbed; step assembly 234 is engaged with track assembly 232 by pivot assembly 285, and handrail assembly 236 is engaged with step assembly 234.

Figure 13:
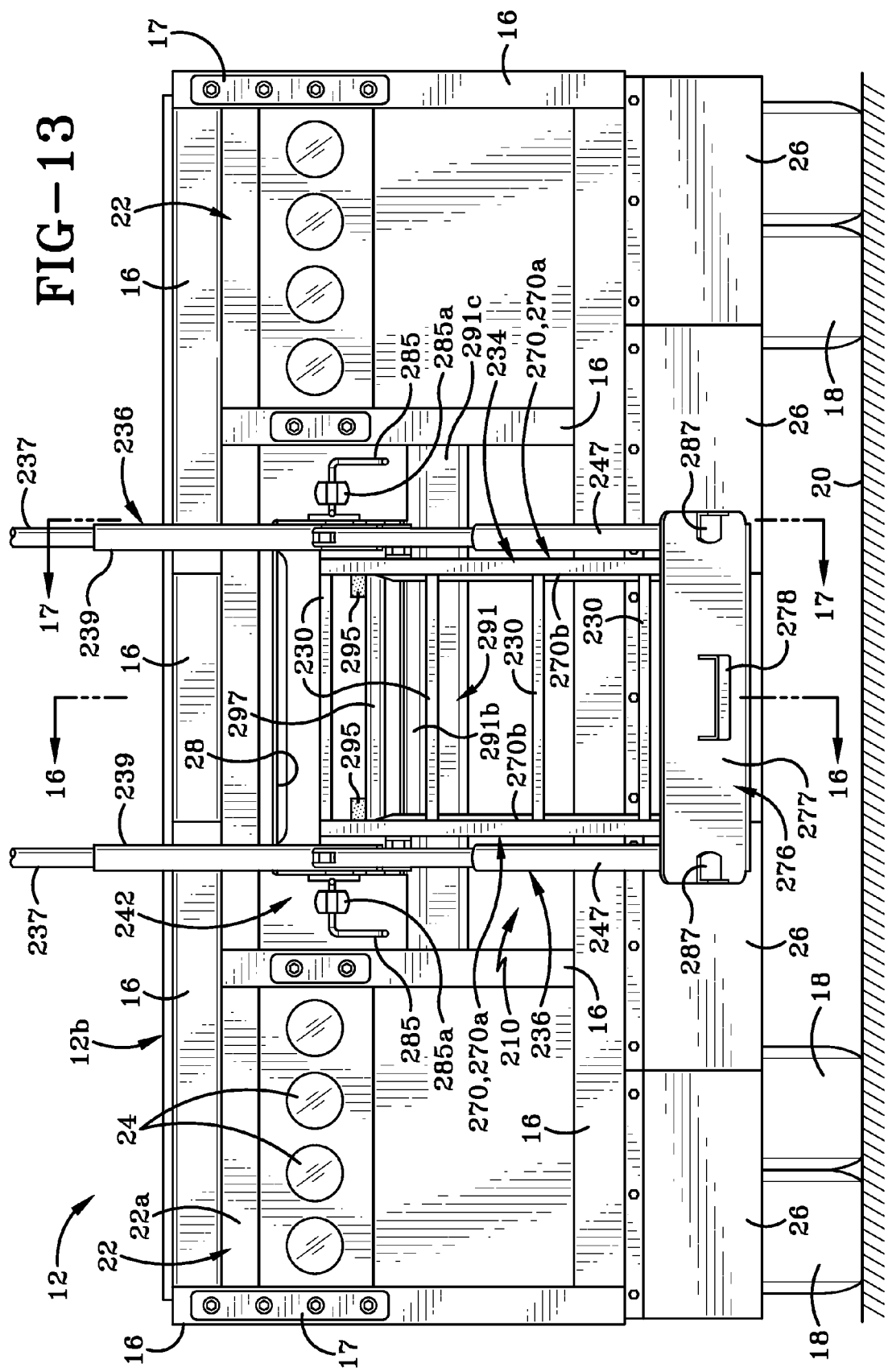
FIG. 13 is a rear view of a trailer showing a second embodiment of a stair assembly in accordance with an aspect of the invention, with the assembly shown in an operational position and with a handrail assembly in an extended position.
Figure 14:
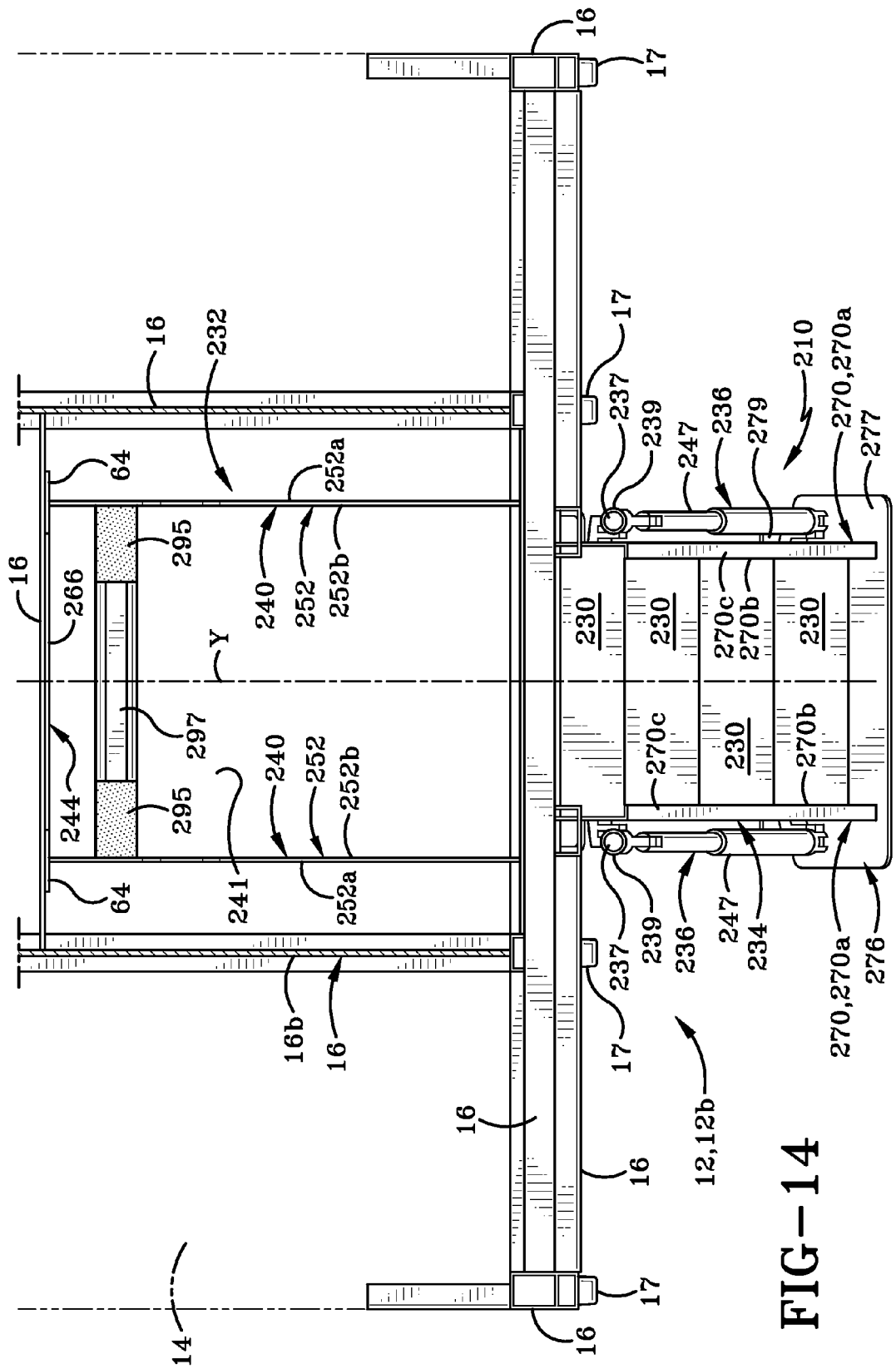
FIG. 14 is a top view of a back region of the trailer showing the stair assembly of FIG. 13 in the operational position with the handrail assembly in the extended position.

Referring to FIG. 14, it will be understood that track assembly 232 is similar to track assembly 32 (shown in FIGS. 6 and 7). Track assembly 232 includes two spaced apart tracks 240, a sill 242 (FIG. 13), and a plate 244 that are all engaged with each other. Sill 242 and plate 244 are disposed substantially at right angles relative to tracks 240. Tracks 240, sill 242 and plate 244 bound and define a retaining space 241 thereinbetween. Sill 242 is configured to be secured to a region of frame 16 and/or rear panel 22. In particular, sill 242 is disposed in abutting contact with the exterior surface 22a of rear panel 22 (FIG. 13). The positioning of sill 242 ensures that stair assembly 210 is strong and stable especially when step assembly 234 is moved through aperture 28 and into retaining space 241, as will be hereinafter described. Sill 242 is substantially identical to sill 42 and will therefore not be described in any additional detail. Rear panel 22 of vehicle will substantially resist the inward force of the inward and outward movement of step assembly 234 and will thereby aid in step assembly moving smoothly into and out of retaining space 241.

Each track 240 extends inwardly away from the interior surfaces of sill 242 and away from interior surface 22b (FIG. 16) of rear panel 22. Tracks 240 are oriented substantially at right angles to the interior surface of sill 242 and interior surface 22b of rear panel 22. Tracks 240 are disposed generally parallel to each other. Each track 240 comprises a guide portion 252 (FIG. 14) which is an elongate, generally planar member that extends substantially parallel to longitudinal axis "Y" of track assembly 232. Guide portion 252 has an exterior surface 252a, an interior surface 252b, a top 252c (FIG. 16), a bottom 252d, a first end 252e and a second end 252f. First end 252e is engaged with sill 242 and second end 252f is engaged with plate 244 in any suitable manner. For example, first and second ends 252e, 252f may be welded to the respective sill 242 or plate 244. Although not shown herein, first and second ends 252e, 252f may, alternatively, be specially shaped and interlockingly engaged in complementary notched regions in sill 242 and plate 244. The first end of track assembly 232 is adjacent panel 22 and first ends 252e of tracks 240. The second end of track assembly 232 is adjacent second ends 252f of tracks 240 and spaced a distance from panel 22.

In accordance with an aspect of the invention, a longitudinally aligned slot 256 (FIG. 16) is defined in each guide portion 252. Slot 256 originates a distance inwardly from first end 252e of guide portion 252 and terminates a distance inwardly from second end 252f thereof. Slot 256 extends between exterior and interior surfaces 252a, 252b and is of a height "H2" and length "L".

In accordance with an aspect of stair assembly 210, slot 256 includes a first end adjacent plate 244 and a second end adjacent sill 242. A region 256a (FIG. 16) adjacent plate 244 is oriented at an angle α relative to the rest of slot 256. Second end 256b of slot 256 is remote from region 256a. Angled region 256a slopes downwardly toward the ground surface 20 upon which the vehicle rests. Top 252c of guide portion 252 includes a generally semi-circular protrusion 258 in a region proximate plate 244. A generally C-shaped aperture 260 is defined within protrusion 258 and is in communication with slot 256. The angled region 256a of slot 256 originates proximate the forwardmost part of protrusion 258 and terminates inwardly of plate 244. The purpose of slot 256, and most particularly angled region 256a thereof will be described later herein. Aperture 260 is substantially identical to aperture 60 and serves the same purpose. Aperture 260 will therefore not be further discussed.

Plate 244 engages second ends 252f of tracks 240. Plate 244 is substantially identical to plate 44 (FIG. 6) and will therefore not be further described except to say that it includes a web 266 and plate members 264, which are identical to web 66 and plate member 64. Second ends 252f are disposed substantially at right angles to plate members 264 and are secured thereto in any suitable manner such as by welding or engaging protrusions (not shown) on second ends 252f in complementary notches (not shown) on plate members 264. Plate 244 is secured to any suitable portion of frame 16 by fasteners such as nuts and bolts or rivets, or by welding, adhesive or any suitable means. Plate 244 gives strength and rigidity to track assembly 232. Both plate 244 and sill member 242 ensure that track assembly 232 is sufficiently secured to frame 16 so that track assembly 232 will adequately support step assembly 234 when in the storage position and the vehicle 12 is moving.

Figure 15:
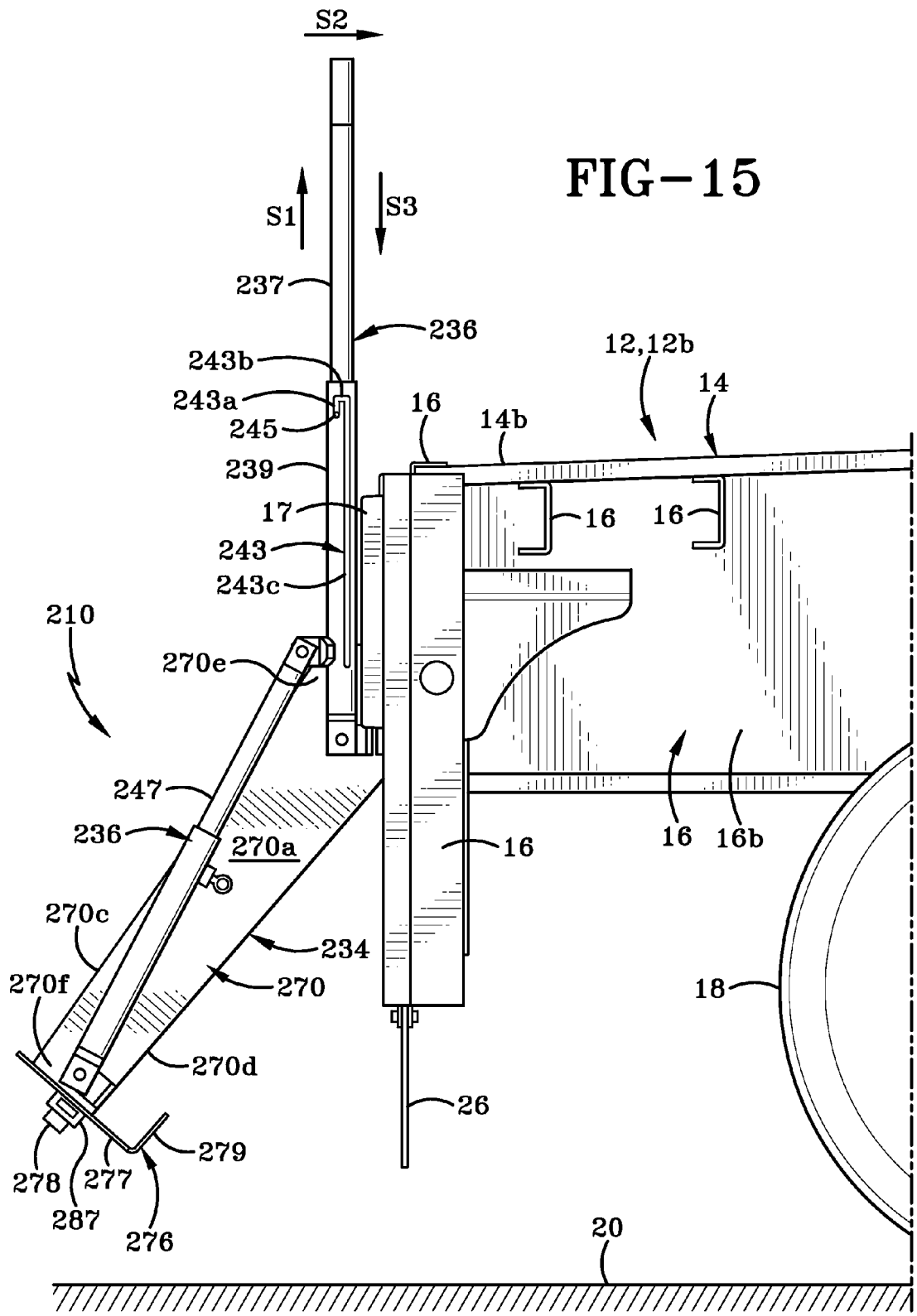
FIG. 15 is a right side view of the back region of the trailer shown in FIG. 14.

In accordance with an aspect of the invention and as shown in FIG. 13, step assembly 234 includes a pair of spaced apart and parallel rails 270. Each rail 270 is a generally planar member having an exterior side 270a, an interior side 270b, a first edge 270c (FIG. 15), a second edge 270d, a first end 270e and a second end 270f. First end 270e is disposed at a first angle relative to first edge 270c. Preferably, that first angle is about 235°. Essentially, this means that when step assembly 234 is disposed in the operational position, first end 270e will be generally horizontally oriented and substantially parallel to the ground surface 20 (FIG. 13). Second end 270f is disposed at an angle of about 265° relative to first edge 270c. Additionally, as best seen in FIG. 15, first edge 270c is not parallel to second edge 270d. Instead, the distance between first and second edges 270c, 270d narrows as you move from first end 270e toward second end 270f.

A plurality of steps 230 extend between the rails 270. Specifically, each step 230 extends between the interior surfaces 270b of the two rails. Each step 230 is fixedly secured to each rail 270 and steps 230 are spaced at regular intervals from each other along the length of rails 270. Each step 230 has a first surface 230a (FIG. 16) and a second surface 230b. First surface 230a may be provided with a textured finish to substantially prevent person "P" from slipping thereon when climbing up and down steps 230. It will also be noted that steps 230 are configured so that they are substantially horizontal when step assembly 234 is in the operational position as shown in FIG. 13.

In accordance with an aspect of the invention, a base plate 276 extends between second ends 270f of the two rails 270. Base plate 276 is generally L-shaped when viewed from the side (FIG. 15) and comprises a first leg 277 and a second leg 279 that are disposed generally at right angles to each other. First leg 277 preferably is substantially longer than second leg 279. First leg 277 is secured to second ends 270f of rails 270 and is oriented such that first leg 277 is substantially at right angles to rails 270. When step assembly 234 is moved to a closed position, such as is illustrated in FIG. 19, first leg 277 is generally aligned or coplanar with rear panel 22 of truck 12. A handle 278 is provided on first leg 277 to help a person push and pull on step assembly 234 so as to move the same between the storage and operational positions.

A latching mechanism 283 is provided on base plate 276. Latching mechanism 283 comprises a pair of latching pins 285 mounted on rear panel 22 of truck 12 and cooperating brackets 287 mounted on base plate 276. Latching pins 285 are mounted via brackets 285a to panel 22. Each bracket 287 defines an aperture (not numbered) therein and through which a first end of the associated latching pin 285 is selectively insertable. Latching pins 285 are each able to be rotated about an axis aligned with the leg of the pin which passes through bracket 285a. Latching pins 285 are also slidable along that axis toward and away from brackets 287. When step assembly is in the storage position (FIG. 19) and base plate 276 is aligned with rear panel 22, each latching pin 285 will be manipulated to insert the first end of pin 285 through the aperture in the adjacent bracket 287. This is accomplished on both sides of base plate 276, thus securing base plate 276 in a latched position to rear panel 22. When base plate 276 is in the latched position, step assembly 234 will not accidentally slide out of aperture 28 in rear panel 22 nor can step assembly 234 be moved from the storage position to the operational position. When it is desired to use step assembly 234, latching pins 285 are slid out of the aperture in the associated bracket 287. This breaks the engagement of base plate 276 and rear panel 22. The person is then able to grasp handle 278 and pull step assembly 234 out of aperture 28 and extend assembly 234 into the operational position.

A pivot assembly 285 secures step assembly 234 to track assembly 232 and enables step assembly 234 to move between the storage and operational positions. Pivot assembly 285 is substantially identical to the first pivot assembly of stair assembly 10. Pivot assembly 285 comprises a pair of mounting brackets 280 (FIG. 17) and first and second rollers 286. Each mounting bracket 280 is welded to exterior surface 270a of one of the first and second rails 270. First and second rollers 286 are mounted to rails 270 in a similar fashion to the way first and second rollers 86 are mounted to rails 70 and thus will not be further described. Suffice to say that each roller 286 is mounted on a shaft 286a (FIG. 16) which permits roller 286 to rotate about an axis which extends along shaft 286a. Roller 286 is substantially identical to roller 86 and engages in slot 256 and aperture 260 of track assembly 232 in the same manner that roller 86 engages in slot 56 and aperture 60 of track assembly 40. Rollers 286 enable step assembly 234 to be slid into and out of aperture 28 in rear panel 22 and allow step assembly 234 to glide back and forth on track assembly 232.

In accordance with the present invention, stair assembly 210 includes a first support and a second support which are contacted by step assembly 234 in one or the other of the storage and operational positions. The first support comprises a shock absorbing structure that is engaged by step assembly 234 when in the storage position. Preferably, this first support comprises one ore more rubber feet 295 positioned beneath tracks 240 and adjacent plate 244. Feet 295 are mounted in a U-shaped support beam 297 which is positioned a distance beneath track assembly 232. Preferably, the support beam 297 extends between the first and second tracks of track assembly 232. Support beam 297 preferably is secured to frame 16 but it may, alternatively, form part of track assembly 232. Each foot 295 comprises a rubber strip that is received within a channel defined by the U-shaped support beam 297. The rubber strip extends outwardly for a distance above beam 297 and is positioned to be contacted by step assembly 234 when step assembly is in the storage position. It will be understood that instead of two separate feet 295, a single rubber strip may extend between first and second tracks 240, or more than two feet 295 may be provided on beam 297.

When step assembly 234 is moved to the storage position, rollers 286 which secure step assembly 234 to track assembly 232 slide along slots 256. When rollers 286 reach angled regions 256a of slots 256, the rollers 286 slide down the slope of angled region 256a and toward plate 244. This motion brings a portion of lower edge 270d of rails 270 on step assembly 234 into contact with feet 295 extending upwardly from support beam 297. Since feet 295 are made of rubber, the feet 295 will cushion the step assembly 234 as vehicle moves over the road surface 20. Thus, rattling of step assembly 234 will be reduced as will the tendency of step assembly 234 to bounce within track assembly 232. This is also more particularly accomplished because of the provision of the angled regions 256a of slots 256 cause step assembly 232 to be held by gravity on the first support (beam 297 and associated feet 295. The angled slope of region 256b also substantially prevents step assembly 234 from accidentally sliding backwardly along first and second tracks 240 and toward panel 22. It should also be noted that the tolerance between rollers 286 and slot 256 is fairly tight to ensure that rollers 286 themselves have a reduced tendency to bounce up and down within slot 256 and thereby become damaged.

In accordance with another aspect of the present invention, a second support is provided as part of stair assembly 210. This second support comprises a support beam 291 that is mounted onto a portion of the vehicle's frame 16 (see FIGS. 16 and 19). In particular, support beam 291 is positioned a distance "D" beneath aperture 28 and where base plate 276 will be positioned when step assembly 234 is in the storage position. Preferably support beam 291 is disposed a distance vertically downward from second end 256b of slot 256 but slightly rearward thereof.

Support beam 291 is generally C-shaped when viewed from the side and includes a first arm 291a, a second arm 291b, a third arm 291c and a fourth arm 291d. First and fourth arms 291a, 291d are generally parallel to each other and are disposed generally horizontally. Third arm 291c is disposed generally vertically and at right angles to first and fourth arms 291a, 291d and parallel to panel 22. Third arm 291c is disposed at an angle relative to each of first and third arms 291a, 291c. Preferably, the angle is about 45° but the angle at which third arm 291c is oriented may be greater or less than 45°. In particular, third arm 291c is positioned at an angle that is complementary to the angle at which lower surface 270d of step assembly 234 is oriented when step assembly 234 is in the operational position. As shown in FIG. 16, when step assembly 234 is in the operational position, the lower surfaces 270d of rails 270 of step assembly 234 rest on third arm 291c. This configuration ensures that step assembly 234 has adequate support for when a person climbs up and down the steps 230.

FIG. 16 also shows that first arm 291a of support beam 291 defines a channel 291e therein. A rubber stop 293 is provided in channel 291e. When step assembly 234 is moved to the storage position (FIG. 18), second leg 279 of base plate 276 at the end of step assembly 234 rests upon rubber stop 293. Rubber stop 293 acts as a type of shock absorber as vehicle 12 travels over a ground surface or a road. Stop 293 diminishes rattling of step assembly 234 and aids in preventing damage to step assembly 234 as it absorbs the shocks to step assembly 234 as assembly 234 is bounced up and down relative to frame 16 as the vehicle moves.

Stair assembly 210 further includes one or two handrail assemblies. Each handrail assembly includes a collapsible handrail 236 that is similar or identical to handrail 36. Preferably, handrail 36 is selectively extendable when stair assembly 210 is in an operational position and is collapsible when stair assembly 210 is to be moved into a storage position. As shown in FIG. 15, each handrail includes a first tubular member 237 and a second tubular member 239. First tubular member 237 is receivable within a bore (not shown) of second tubular member 239. Second tubular member 239 defines a substantially L-shaped slot 243 therein. A pin 245 extends outwardly from first tubular member 237 and is received in slot 243. In order to collapse the handrail 236, first tubular member 237 is first moved in an upward direction, indicated by arrow "S1". This moves pin 245 upwardly within the first leg 243a of slot 243 to the point that pin 245 is positioned at the junction of first leg 243a and second leg 243b of slot 243. First tubular member 237 is then moved toward rear panel 22 of the vehicle in the direction of arrow "S2". This moves pin 245 along the second leg 243*b* of slot 243 to the point that pin 245 is positioned at the junction of second leg 243*b* and third leg 243*c* of slot 243. First tubular member 237 is then moved downwardly in the direction of "S3" so that pin 245 moves along third leg 243*c* of slot 243. As first tubular member 237 is moved in this direction, first tubular member 237 slides inwardly into the bore of second tubular member 239 and thereby collapses the handrail. Extending the handrail is accomplished by reversing these steps. It will be understood that moving first tubular member 237 in the direction of arrow "S2" may be accomplished by rotating first tubular member 237 about a vertical axis extending through first tubular member 237.

Handrail 236 may alternatively include the push-pin mechanism for locking the handrail in an extended position, as has been described with reference to handrail 36.

Handrail assembly 236 preferably further includes at least one support arm 247 which is pivotally secured to one of the tubular members, preferably to second tubular member 239. Support arm 247 may be substantially identical to support arm 104 and may comprise two telescoping tubes or it may comprise a hydraulic cylinder. It will be understood that any type of collapsible and expandable handrail assembly could be incorporated into stair assembly 210.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A retractable stair assembly for a vehicle, where the vehicle has a frame, said stair assembly comprising:
   a track assembly adapted to be engaged to a portion of the vehicle's frame;
   a step assembly having a first end and a second end;
   a pivot assembly securing the first end of the step assembly to a first end of the track assembly; wherein the step assembly is movable between a storage position and an operational position; and when the step assembly is in the storage position the step assembly is disposed within a space defined in the track assembly; and when the step assembly is in the operational position, the step assembly extends outwardly and downwardly from the first end of the track assembly and is adapted to extend downwardly from the vehicle and toward a ground surface upon which the vehicle rests; and
   a first support is positioned a spaced distance beneath the track assembly; and wherein the first support includes a first surface upon which the step assembly rests when the step assembly is in the storage position; and wherein said track assembly comprises:
      a first track and a second track disposed parallel to each other; wherein each of the first and second tracks has an interior surface, an exterior surface, a top, a bottom, a first end and a second end; where the first ends of the first and second tracks are adapted to be positioned proximate a wall panel of the vehicle; and the space is defined between the interior surface of the first track and the interior surface of the second track; and the first support is positioned beneath the second ends of the first and second tracks; and
      a slot is defined in each of the first and second tracks, said slot extending from proximate the first end thereof to proximate the second end thereof; and wherein the pivot assembly is engaged in the slots of the first and second tracks.

2. The retractable stair assembly as defined in claim 1, wherein the first support is provided adjacent the second ends of the first and second tracks.

3. A retractable stair assembly for a vehicle, where the vehicle has a frame, said stair assembly comprising:
   a track assembly adapted to be engaged to a portion of the vehicle's frame;
   a step assembly having a first end and a second end;
   a pivot assembly securing the first end of the step assembly to a first end of the track assembly; wherein the step assembly is movable between a storage position and an operational position; and when the step assembly is in the storage position the step assembly is disposed within a space defined in the track assembly; and when the step assembly is in the operational position, the step assembly extends outwardly and downwardly from the first end of the track assembly and is adapted to extend downwardly from the vehicle and toward a ground surface upon which the vehicle rests; and
   a first support is positioned a spaced distance beneath the track assembly; and wherein the first support includes a first surface upon which the step assembly rests when the step assembly is in the storage position; and wherein the first support comprises:
      a beam adapted to be mounted to the vehicle's frame; and
      a resilient pad mounted on the beam; and wherein the resilient pad is positioned so as to be contacted by the step assembly when in the storage position.

4. The retractable stair assembly as defined in claim 3, wherein said track assembly includes a first track and a second track disposed parallel to each other; wherein each of the first and second tracks has an interior surface, an exterior surface, a top, a bottom, a first end and a second end; where the first ends of the first and second tracks are adapted to be positioned proximate a wall panel of the vehicle; and wherein the beam extends laterally from at least beneath the first track to at least beneath the second track.

5. The retractable stair assembly as defined in claim 3, wherein the beam is C-shaped in cross-section and a portion of the resilient pad is provided within a cavity defined in the C-shaped pad and another portion of the resilient pad extends outwardly from the cavity.

6. The retractable stair assembly as defined in claim 3, wherein the pad comprises a first pad section and a second pad section that are spaced laterally from each other.

7. A retractable stair assembly for a vehicle, where the vehicle has a frame, said stair assembly comprising:
   a track assembly adapted to be engaged to a portion of the vehicle's frame;
   a step assembly having a first end and a second end;
   a pivot assembly securing the first end of the step assembly to a first end of the track assembly: wherein the step assembly is movable between a storage position and an operational position; and when the step assembly is in the storage position the step assembly is disposed within a space defined in the track assembly; and when the step assembly is in the operational position, the step assembly extends outwardly and downwardly from the first end of the track assembly and is adapted to extend downwardly from the vehicle and toward a ground surface upon which the vehicle rests;
   a first support is positioned a spaced distance beneath the track assembly; and wherein the first support includes a first surface upon which the step assembly rests when the step assembly is in the storage position; and
a second support is positioned a spaced distance beneath the pivot assembly when the pivot assembly is disposed adjacent the first end of the track assembly; wherein the second support includes a first surface upon which the step assembly rests when the step assembly is in the operational position.

8. The retractable stair assembly as defined in claim 7, wherein the second support further includes a second surface upon which the step assembly rests when the step assembly is in the storage position.

9. The retractable stair assembly as defined in claim 8, wherein the first surface of the second support and the second surface thereof are disposed at an angle relative to each other.

10. The retractable stair assembly as defined in claim 8, wherein the second surface of the second support is disposed substantially horizontally and the first surface of the second support is disposed at the angle relative to the horizontal.

11. The retractable stair assembly as defined in claim 8, wherein the step assembly includes a pair of spaced-apart rails; and each rail has an upper surface and a lower surface; and wherein the lower surfaces of the rails abut the first surface of the second support when the step assembly is in the operational position.

12. The retractable stair assembly as defined in claim 11, wherein the lower surface of the rails is angled, and the angle of the lower surface is complementary to the angle of the first surface of the second support.

13. The retractable stair assembly as defined in claim 8, further comprising a resilient member provided on the second surface of the second support; and wherein the step assembly rests on the resilient member when the step assembly is in the storage position.

14. The retractable stair assembly as defined in claim 8, further comprising a channel defined in the second surface of the second support; and wherein the resilient member is mounted within the channel and extends outwardly therefrom for a distance.

15. The retractable stair assembly as defined in claim 14, wherein the step assembly includes a base plate adapted to substantially align with the exterior vehicle panel when the stair assembly is in the storage position; and the base plate is further adapted to be positioned proximate a ground surface upon which the vehicle stands when the stair assembly is in the operational position; and wherein the base plate rests on the resilient member of the second support when the step assembly is in the storage position.

16. A retractable stair assembly for a vehicle, where the vehicle has a frame, said stair assembly comprising:
a track assembly adapted to be engaged to a portion of the vehicle's frame;
a step assembly having a first end and a second end;
a pivot assembly securing the first end of the step assembly to a first end of the track assembly; wherein the step assembly is movable between a storage position and an operational position; and when the step assembly is in the storage position the step assembly is disposed within a space defined in the track assembly; and when the step assembly is in the operational position, the step assembly extends outwardly and downwardly from the first end of the track assembly and is adapted to extend downwardly from the vehicle and toward a ground surface upon which the vehicle rests; and
a first support is positioned a spaced distance beneath the track assembly; and wherein the first support includes a first surface upon which the step assembly rests when the step assembly is in the storage position;
wherein the step assembly includes a base plate adapted to align with the vehicle's wall panel when the stair assembly is in the storage position; and the base plate is further adapted to be disposed proximate a ground surface upon which the vehicle stands when the stair assembly is in the operational position.

17. The retractable stair assembly as defined in claim 16, further comprising a handle mounted to a first surface of the base plate; and wherein the handle is configured to be accessible when the step assembly is in the storage position.

18. The retractable stair assembly as defined in claim 16, further comprising a locking mechanism adapted to selectively secure the base plate to the vehicle's wall panel.

19. The retractable stair assembly as defined in claim 18, wherein the locking mechanism comprises:
a pin member interlockingly engaged with a bracket that is adapted to be secured to the vehicle's rear panel; where the pin member is movable between an extended position and a retracted position; and
a slot defined in the base plate; said slot being complementary to at least a portion of the pin member; and wherein the pin member is received within the slot when the base plate is aligned with the vehicle's rear panel and the pin member is moved to the extended position; and the pin member is withdrawn from the slot when the pin member is moved to the retracted position.

20. The retractable stair assembly as defined in claim 19, wherein the slots each include a first region and a second region; and the first region is disposed generally horizontally and originates proximate the first ends of the first and second tracks and extends toward the second ends of the first and second tracks; and the second region of the slot is continuous with the first region thereof and slopes downwardly at an angle relative to the first region.

21. In combination:
a vehicle having a frame, a workbed mounted on the vehicle's frame and a wall panel mounted on the frame substantially at right angles to the workbed;
an aperture defined in the wall panel; said aperture providing entry to a region beneath an upper surface of the workbed;
a retractable stair assembly engaged with the frame; wherein the retractable stair assembly comprises:
a track assembly engaged with the vehicle's frame; said track assembly mounted in the region beneath the lower surface of the vehicle's workbed;
a step assembly having a first end and a second end;
a pivot assembly securing the first end of the step assembly to the track assembly; wherein the step assembly is movable between a storage position and an operational position; and when the step assembly is in the storage position the step assembly is disposed in a space defined in the track assembly; and when the step assembly is in the operational position, the step assembly extends outwardly and downwardly from the aperture and toward a ground surface upon which the vehicle rests;
a first support positioned a spaced distance beneath the track assembly; the first support including a first surface upon which the step assembly rests when in the storage position; and
a second support mounted on the vehicle a distance beneath the aperture; said second support including a first surface upon which the step assembly rests when the step assembly is in the storage position; and a second surface upon which the step assembly rests when in the operational position.

22. The combination as defined in claim 21, wherein the first surface of the second support and the second surface thereof are disposed at an angle relative to each other.

23. The combination as defined in claim 21, wherein the step assembly includes a pair of spaced-apart rails; and each rail has an upper surface and a lower surface; and wherein the lower surfaces of the rails abut the first surface of the second support when the step assembly is in the operational position; and wherein the lower surface of the rails is angled, and the angle of the lower surface is complementary to the angle of the first surface of the second support.

24. The combination as defined in claim 21, further comprising a resilient member provided on the second surface of the second support; and wherein the step assembly rests on the resilient member when the step assembly is in the storage position.

25. The combination as defined in claim 24, wherein the step assembly includes a base plate adapted to substantially align with the exterior vehicle panel when the stair assembly is in the storage position; and the base plate is further adapted to be positioned proximate a ground surface upon which the vehicle stands when the stair assembly is in the operational position; and wherein the base plate rests on the resilient member of the second support when the step assembly is in the storage position.

\* \* \* \* \*